(12) United States Patent
Selim et al.

(10) Patent No.: US 11,130,269 B2
(45) Date of Patent: Sep. 28, 2021

(54) FULL COLOR 3D PRINTING PEN AND RELATED SYSTEMS AND METHODS

(71) Applicants: Riham M. Selim, Sammamish, WA (US); Mark Fauver, Seattle, WA (US); Ahmed Gaafar, Sammamish, WA (US)

(72) Inventors: Riham M. Selim, Sammamish, WA (US); Mark Fauver, Seattle, WA (US); Ahmed Gaafar, Sammamish, WA (US)

(*) Notice: Subject to any disclaimer, the term of this patent is extended or adjusted under 35 U.S.C. 154(b) by 272 days.

(21) Appl. No.: 16/169,806

(22) Filed: Oct. 24, 2018

(65) Prior Publication Data

US 2019/0118448 A1   Apr. 25, 2019

Related U.S. Application Data

(60) Provisional application No. 62/576,581, filed on Oct. 24, 2017.

(51) Int. Cl.
   *B29C 64/129*   (2017.01)
   *B29C 48/02*   (2019.01)
   (Continued)

(52) U.S. Cl.
   CPC ............ *B29C 48/02* (2019.02); *B29C 48/175* (2019.02); *B29C 64/129* (2017.08);
   (Continued)

(58) Field of Classification Search
   None
   See application file for complete search history.

(56) References Cited

U.S. PATENT DOCUMENTS 4,575,330 A    3/1986 Hull
9,266,286 B1 *  2/2016 Starodubtsev ........ B29C 64/106
(Continued)

FOREIGN PATENT DOCUMENTS

CN    107 081 905 A      8/2017
CN    107081905 A    *   8/2017
(Continued)

OTHER PUBLICATIONS

International Preliminary Report of Patentability for International Application PCT/US2018/057367, dated May 7, 2020, 9 pages.
(Continued)

*Primary Examiner* — Matthew J Daniels
*Assistant Examiner* — Mohammad M Ameen
(74) *Attorney, Agent, or Firm* — Seed IP Law Group LLP

(57) ABSTRACT

Three-dimensional printing pens and related systems and methods are provided. A three-dimensional printing pen may include a plurality of cartridges, each cartridge having a hollow cartridge body sized and shaped to include a colored thixotropic paste, a color of each thixotropic paste being different from a color of another thixotropic paste, and a plurality of nozzles, each nozzle fluidly communicatively coupled to a corresponding cartridge. The three-dimensional printing may further include a motor unit operably coupled to the plurality of cartridges, the motor unit operable to expel the colored thixotropic paste from each cartridge through the corresponding nozzle, a mixing tip fluidly communicatively coupled to the plurality of nozzles, the mixing tip sized and shaped to dispense therethrough one or more of the colored thixotropic pastes in a form of an output thixotropic paste, and a projection module. The projection module may include a light engine assembly that emits light having a wavelength, the light being projected to the output thixotropic paste to cure the output thixotropic paste that is dispensed from the mixing tip.

19 Claims, 14 Drawing Sheets

(51) Int. Cl.
  *B29C 64/259* (2017.01)
  *B29C 64/209* (2017.01)
  *B29C 48/17* (2019.01)
  *B33Y 70/00* (2020.01)
  *B33Y 10/00* (2015.01)
  *B33Y 30/00* (2015.01)
  *B29C 64/106* (2017.01)

(52) U.S. Cl.
  CPC .......... *B29C 64/209* (2017.08); *B29C 64/259* (2017.08); *B29C 64/106* (2017.08); *B33Y 10/00* (2014.12); *B33Y 30/00* (2014.12); *B33Y 70/00* (2014.12)

(56) References Cited

U.S. PATENT DOCUMENTS

| | | | | |
|---|---|---|---|---|
| 2015/0174824 | A1* | 6/2015 | Gifford | B29C 64/182 |
| | | | | 425/183 |
| 2015/0190968 | A1* | 7/2015 | Griszbacher | B29C 64/393 |
| | | | | 264/40.6 |
| 2016/0039148 | A1* | 2/2016 | Marino | B29C 64/393 |
| | | | | 425/150 |
| 2016/0046073 | A1 | 2/2016 | Hadas | |
| 2016/0361867 | A1* | 12/2016 | Hang | B29C 64/264 |
| 2017/0297245 | A1 | 10/2017 | Dilworth et al. | |

FOREIGN PATENT DOCUMENTS

| | | | |
|---|---|---|---|
| KR | 101 673 234 | B1 | 11/2016 |
| KR | 101 701 930 | B1 | 2/2017 |
| KR | 101701930 | B1 * | 2/2017 |
| KR | 101 749 597 | B1 | 6/2017 |
| KR | 101749597 | B * | 6/2017 |
| WO | 2016/157169 | A1 | 10/2016 |
| WO | WO-2016-157169 | A1 * | 10/2016 |
| WO | 2017/083382 | A1 | 5/2017 |
| WO | 2017/156415 | A1 | 9/2017 |
| WO | WO-2017-156415 | A1 * | 9/2017 |

OTHER PUBLICATIONS

International Search Report and Written Opinion for PCT/US2018/057367, dated Feb. 18, 2019, 8 pages.

* cited by examiner

FULL COLOR 3D PRINTING PEN AND RELATED SYSTEMS AND METHODS

BACKGROUND

Technical Field

The present disclosure is generally related to printing pens and, more particularly, to three-dimensional printing pens.

Description of the Related Art

As the desire to create three-dimensional (3D) models outside of a lab or factory environment grows, such as in the field or in-situ situations, 3D printing pens have become more useful. Conventional 3D printing pens have generally been designed to deliver mono-pigment models. For example, U.S. Pat. No. 9,266,286 describes a 3D printing pen for extruding and curing a radiation-curable pasty polymer composition that delivers mono-pigment models. Such conventional 3D printing pens are generally deficient for creating 3D color models because a user is required to insert a color cartridge into the 3D printing pen, perform the desired creative aspects with that pen, then remove that color cartridge in order to insert another different color cartridge. Such 3D printing pens and methods of delivery are time consuming and lack the ability to efficiently generate robust 3D models.

BRIEF SUMMARY

The present disclosure provides various embodiments of 3D printing pens and systems and methods related thereto that allow a user to produce multiple colors in production of a 3D model while not requiring the user to insert a different color cartridge at the point at which a new color is desired. Further, various embodiments of the 3D printing pens and system and methods related thereto described herein allow multiple colors to be used within a 3D printing pen while avoiding colors being extruded from the 3D printing pen from bleeding into previously extruded colors.

For example, in one example, non-limiting embodiment or implementation, a three-dimensional printing pen can be summarized as including a plurality of cartridges, each cartridge having a hollow cartridge body sized and shaped to include a colored thixotropic paste, a color of each thixotropic paste being different from a color of another thixotropic paste, and a plurality of nozzles, each nozzle fluidly communicatively coupled to a corresponding cartridge. The three-dimensional printing pen can further include a motor unit operably coupled to the plurality of cartridges, the motor unit operable to expel the colored thixotropic paste from each cartridge through the corresponding nozzle, a mixing tip fluidly communicatively coupled to the plurality of nozzles, the mixing tip sized and shaped to dispense therethrough one or more of the colored thixotropic pastes in a form of an output thixotropic paste, and a projection module. The projection module can have a light engine assembly that emits light having a wavelength, the light being projected to the output thixotropic paste to cure the output thixotropic paste that is dispensed from the mixing tip.

In another example, non-limiting embodiment or implementation, a three-dimensional printing system can be summarized as including a three-dimensional printing pen that includes a plurality of cartridges, each cartridge having a hollow cartridge body sized and shaped to include a colored thixotropic paste, a color of each thixotropic paste being different from a color of another thixotropic paste, a plurality of nozzles, each nozzle fluidly communicatively coupled to a corresponding cartridge, and a mixing tip fluidly communicatively coupled to the plurality of nozzles, the mixing tip sized and shaped to dispense therethrough one or more of the colored thixotropic pastes in a form of an output thixotropic paste. The three-dimensional printing system can include a dispensing apparatus having a motor unit, a projection module having a light engine assembly, and control circuitry that is communicably coupled to the three-dimensional printing pen, the dispensing apparatus, and the projection module, the control circuitry. The control circuitry can generate one or more signals indicative of a color of the output thixotropic paste, generate one or more signals to cause the motor unit to expel the colored thixotropic paste from each cartridge through the corresponding nozzle to substantially match the color of the output thixotropic paste, and generate one or more signals to cause the projection module to emit light from the light engine assembly at a wavelength which cures the output thixotropic paste to form a desired object.

In another example, non-limiting embodiment or implementation, a method can be summarized as including receiving, by at least one microprocessor, one or more signals at a three-dimensional printing pen, identifying a color of an output thixotropic paste, in response to the receiving the one or more signals at the three-dimensional printing pen, dispensing, by the at least one microprocessor, one or more colored thixotropic pastes that substantially match the color of the output thixotropic paste, and causing, by the at least one microprocessor, a projection module to emit a light having a wavelength which cures the output thixotropic paste to form an object.

DETAILED DESCRIPTION

Reference throughout this specification to "one embodiment," "one implementation," "an embodiment," or "an implementation" means that a particular feature, structure or characteristic described in connection with the embodiment or implementation is included in at least one embodiment or one implementation. Thus, the appearances of the phrases "in one embodiment," "in one implementation," "in an implementation," or "in an embodiment" in various places throughout this specification are not necessarily all referring to the same embodiment or implementation. Furthermore, the particular features, structures, or characteristics may be combined in any suitable manner in one or more embodiments or implementations.

In the following description, certain specific details are set forth in order to provide a thorough understanding of various embodiments or implementations. However, one skilled in the art will understand that the embodiments or implementations may be practiced without these details. In other instances, well-known structures associated with 3D printing pens, gears, motors, and related systems and methods have not been described in detail to avoid unnecessarily obscuring the descriptions of the embodiments or implementations.

Unless the context requires otherwise, throughout the specification and claims which follow, the word "comprise" and variations thereof, such as "comprises" and "comprising" are to be construed in an open sense, that is, as "including, but not limited to."

Figure 1:
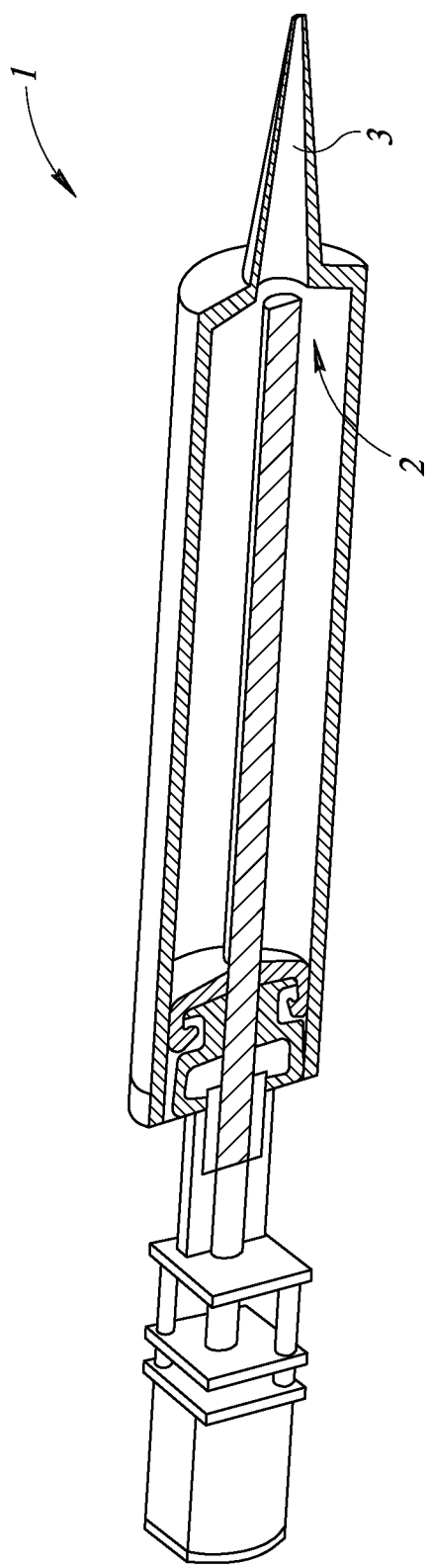
FIG. 1 is a partial cutaway side view of a conventional 3D printing pen.

FIG. 1 illustrates a conventional 3D printing pen 1. The conventional 3D printing pen 1 includes a channel 2 having a photopolymer stored therein and an extruder 3. In use, the photopolymer stored therein is heated and extruded from the conventional 3D printing pen 1. Upon exposure to a light source, the photopolymer hardens into the desired shape. The conventional 3D printing pen 1, however, fails to describe, among other things, the functionality or the structure capable of dispensing multiple colors through the extruder 3 concurrently while the conventional 3D printing pen 1 is in use.

FIGS. 2-10 illustrate a 3D printing pen 10, according to one example, non-limiting embodiment, that is capable of dispensing thixotropic paste(s) of multiple colors simultaneously, dynamically mixing the thixotropic paste(s) of multiple colors at suitable and/or desired ratios, and/or curing the dispensed material to form a desired three-dimensional object, among other things described in more detail below.

The 3D printing pen 10 includes a controller 11, a plurality of cartridges 12a, 12b, 12c, 12d, 12e (collectively referred to herein as cartridge 12), a dispensing apparatus 14, a dynamic mixing apparatus 16, and an end cap assembly 17. Although shown only partially in FIG. 2, the 3D printing pen 10 includes a housing 13 that is sized and shaped to house, either fully or in part, each of the components of the 3D printing pen 10. Each cartridge 12 includes a cartridge body 19 (e.g., cartridge body 19a, 19b, 19c, 19d, 19e, collectively or individually referred to as cartridge body 19) that is sized and shaped to hold therein one or more colored thixotropic photopolymer paste(s) 18, and a cartridge nozzle 20 (e.g., cartridge nozzle 20a, 20b, 20c, 20d, 20e, collectively or individually referred to as cartridge nozzle 20) that is sized and shaped to dispense the one or more colored thixotropic paste(s) 18. In one embodiment, the 3D printing pen 10 may employ a CMYKW color model under which one cartridge body 19, e.g., cartridge body 19a, may include a cyan colored thixotropic photopolymer paste 18; one cartridge body 19, e.g., cartridge body 19b, may include a magenta colored thixotropic photopolymer paste 18; one cartridge body 19, e.g., cartridge body 19c, may include a yellow colored thixotropic photopolymer paste 18; one cartridge body 19, e.g., cartridge body 19d, may include a white colored thixotropic photopolymer paste 18; and one cartridge body 19, e.g., cartridge body 19d, may include a key or black colored thixotropic photopolymer paste 18. It should be understood, upon review of the present disclosure, that the reference numeral 18 may individually refer to any one of the different colored thixotropic pastes described herein, including cyan, magenta, yellow, key or black, or white colored thixotropic pastes.

In some embodiments, one or more cartridges 12 including cyan, magenta, yellow, white, and/or key or black colored thixotropic photopolymer paste 18 may be omitted or excluded. For example, in some embodiments the 3D printing pen 10 may include cartridges for dispensing colored thixotropic pastes 18 representing cyan, magenta, yellow, and black colored pastes only. Again, in other embodiments, any one of the cartridges 12 comprising various other colored thixotropic pastes 18 may be included or omitted.

The one or more colored thixotropic paste(s) 18 may include, in some embodiments, a liquid photopolymer resin, a thixotropic filling agent, an ultraviolet (UV) curing ink, or any combination thereof. For example, the liquid photopolymer resin may comprise a mixture of multi-functional monomers and oligomers that are combined to achieve a desired physical property. Suitable photopolymer resins may include, for example, various resins described in U.S. Pat. Nos. 9,266,286 and 4,575,330, both of which are incorporated herein by reference. In some embodiments, suitable photopolymers may comprise polyether methyl acrylate-based materials.

In some embodiments, the thixotropic filling agent may include fumed silica, sold under the tradenames of Cab-O-Sil® or Aerosil®. In some embodiments, the thixotropic filling agent may comprise linear sulfated polysaccharides extracted from red edible seaweeds, such as carrageenans. In some embodiments, the thixotropic filling agent may comprise a synthetic water-soluble polymer, such as a hydrogel. In some embodiments, the water-soluble polymer may comprise liquid or solid PEG gel. In some embodiments, the colored thixotropic paste 18 may further include milled glass fiber or other suitable materials to improve strength, dimensional stability, and/or increase elastic modulus. In some embodiments, any combination of the various thixotropic filling agents may be included in the one or more colored thixotropic paste(s) 18.

The Ultraviolet (UV) curing ink may comprise reactive monomers, photo initiators, oligomers, suitable pigments and additives that, when exposed to UV light, for example, create a rigid, extruded 3D shape or structure. In some embodiments, the composition of the one or more colored thixotropic paste(s) 18 may include UV curing ink at approximately 10% by weight. In other embodiments, other weight percentages of the UV curing ink may be selected based on desired outcomes.

Figure 2:
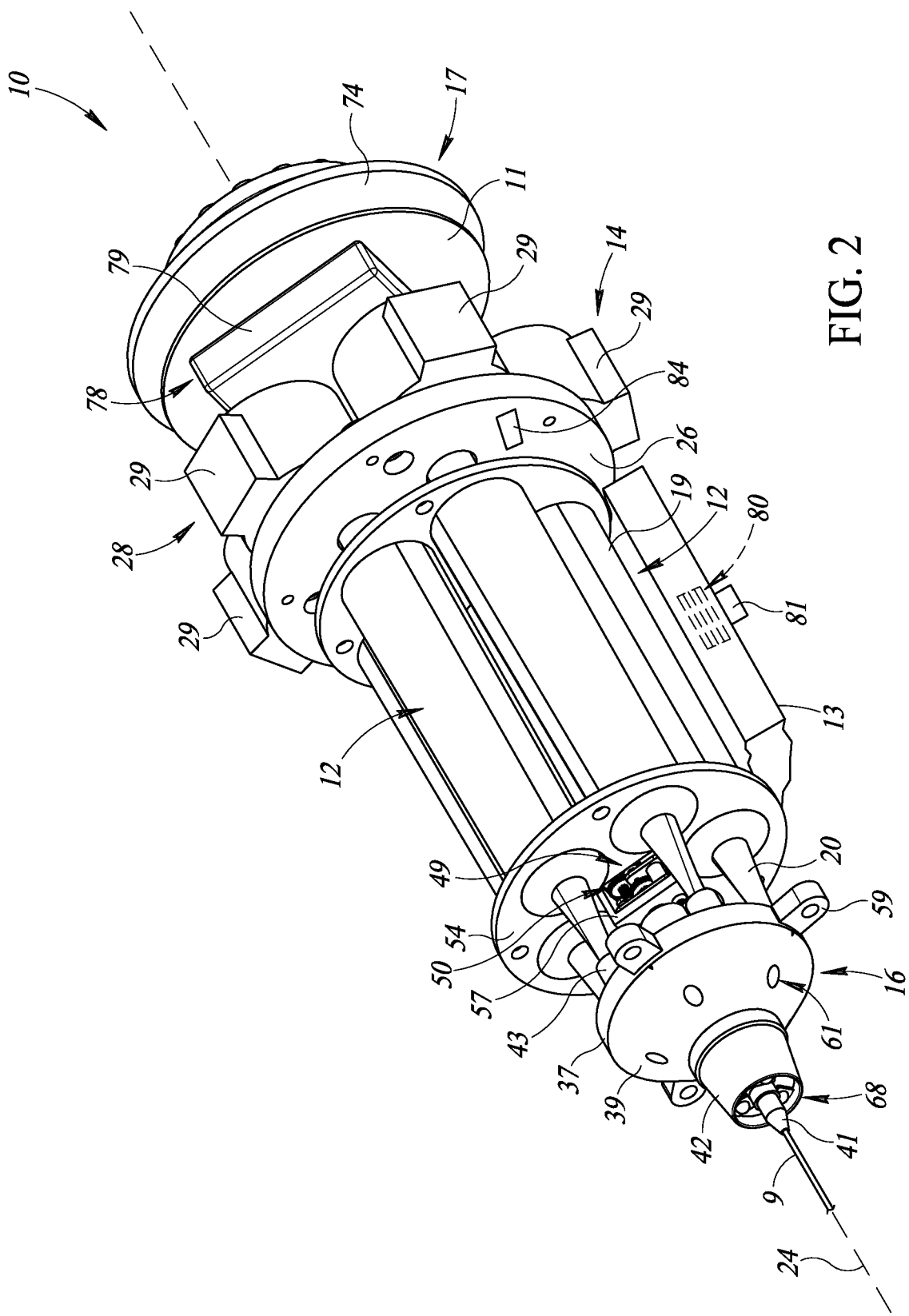
FIG. 2 is an isometric view of a 3D printing pen according to one example, non-limiting embodiment, with certain components removed for clarity of illustration and description.
Figure 3:
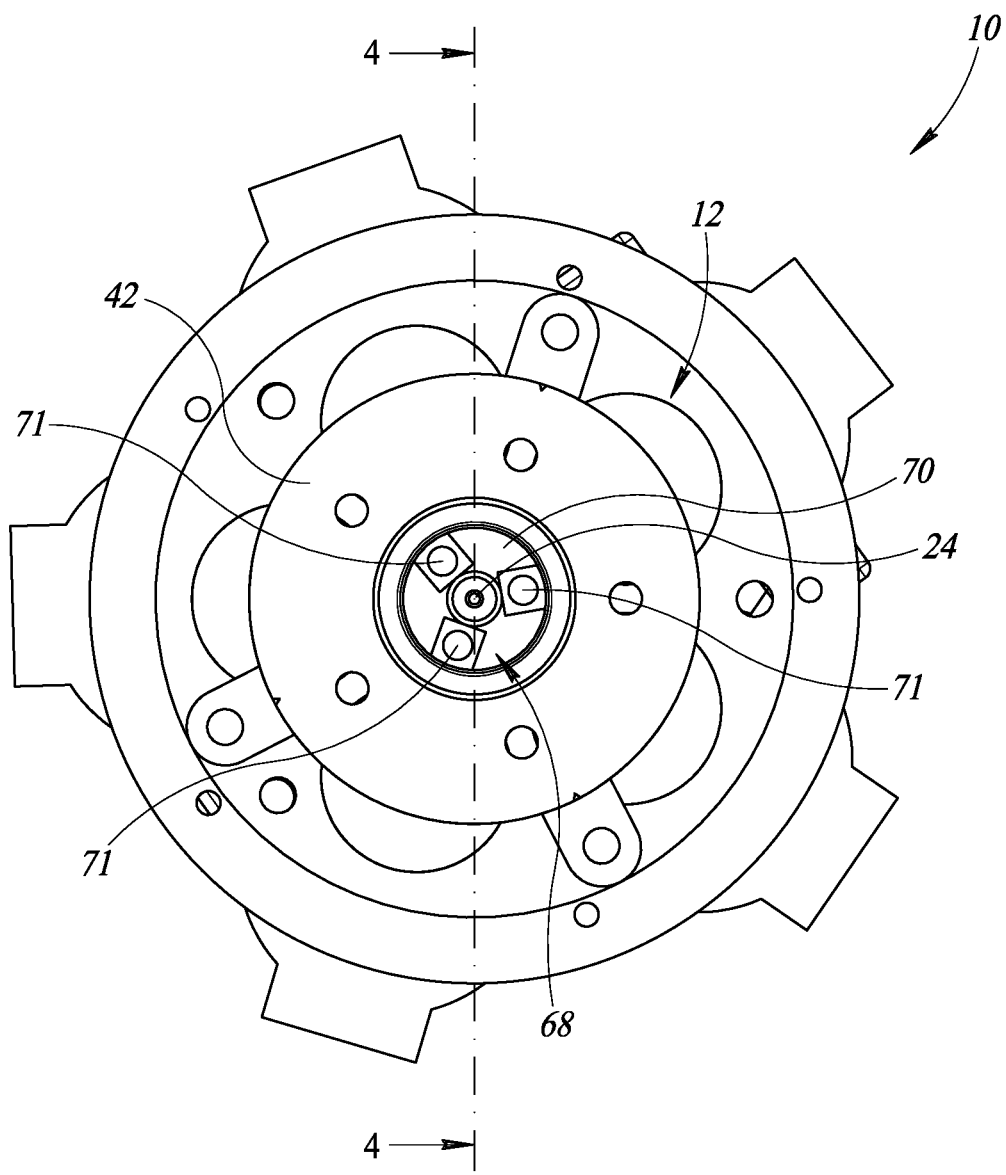
FIG. 3 is a front view of the 3D printing pen of FIG. 2.
Figure 4:
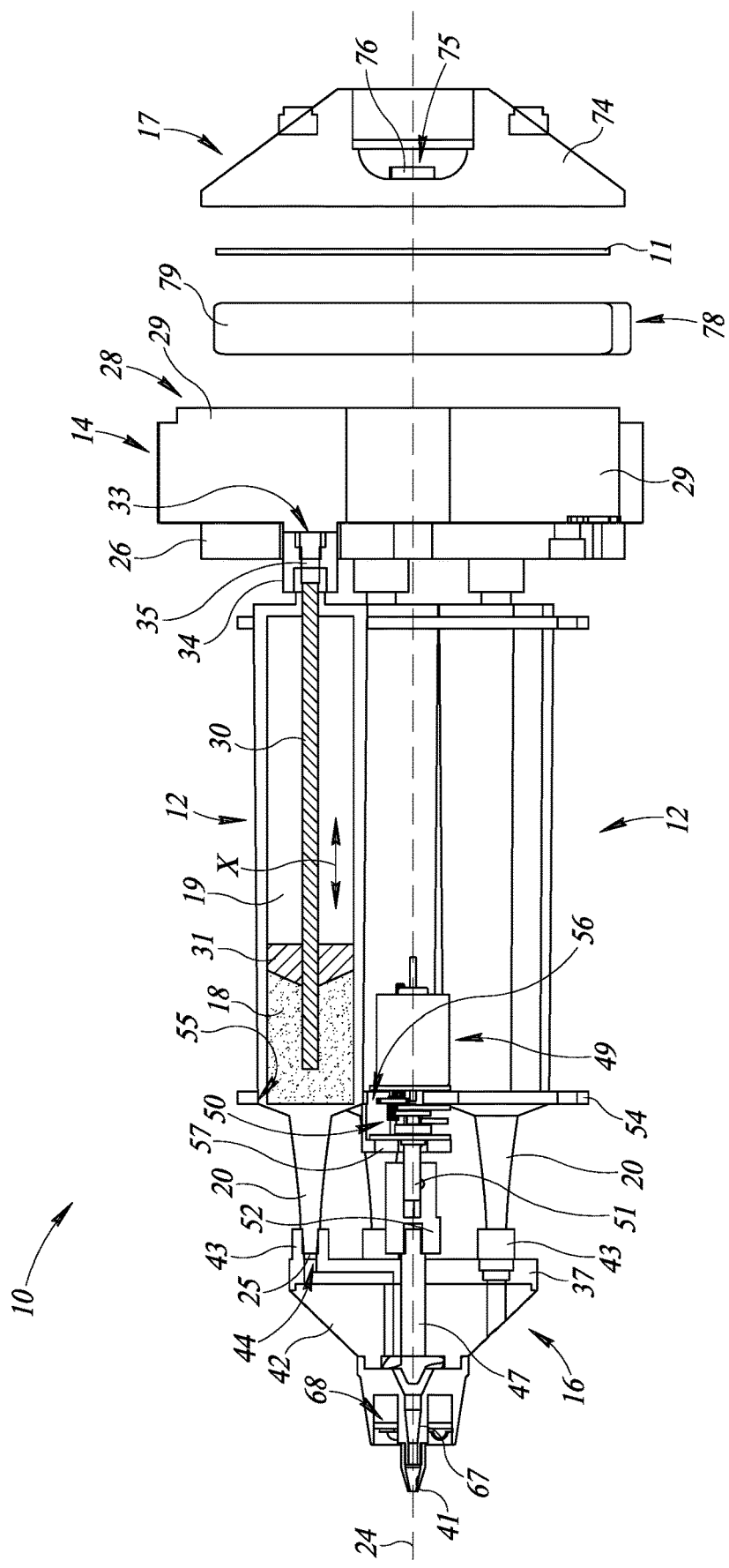
FIG. 4 is a cross-sectional view of the 3D printing pen of FIG. 2, taken along lines 4-4.
Figure 5:
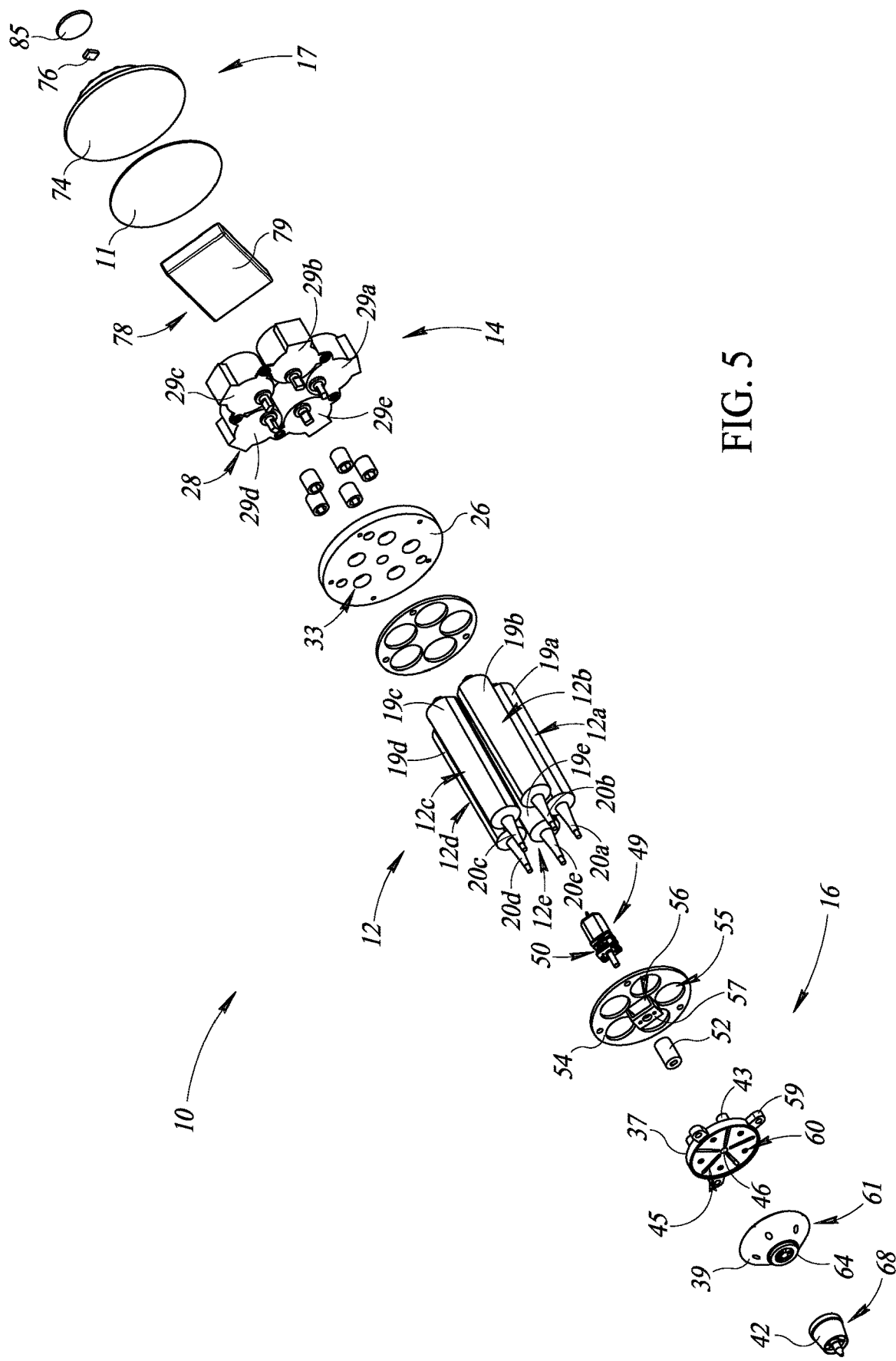
FIG. 5 is a partially exploded view of the 3D printing pen of FIG. 2.
Figure 6:
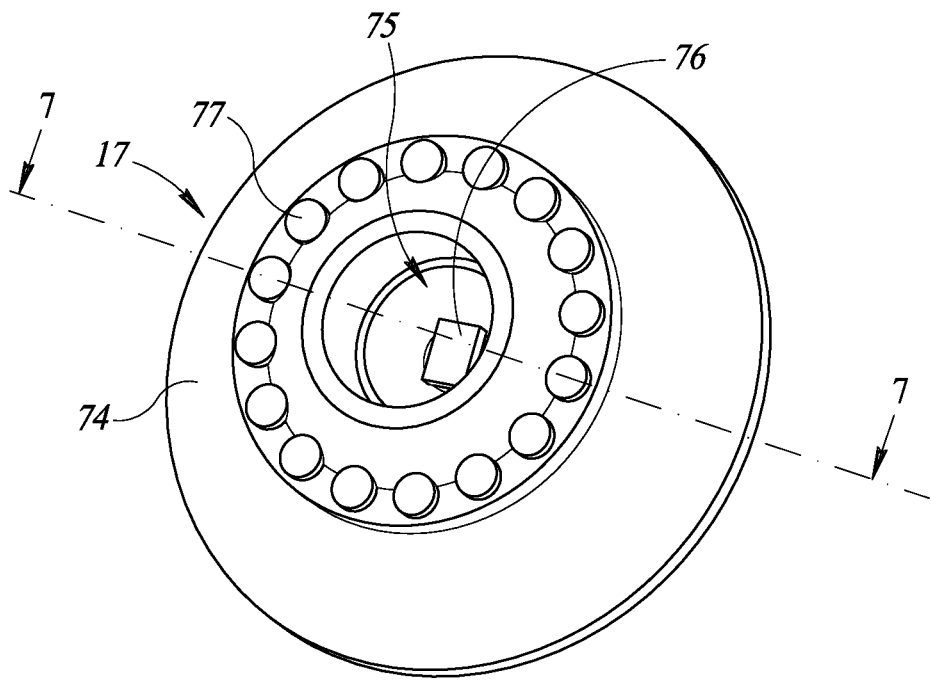
FIG. 6 is an isometric view of an end cap assembly of the 3D printing pen of FIG. 2, according to one example, non-limiting embodiment.
Figure 7:
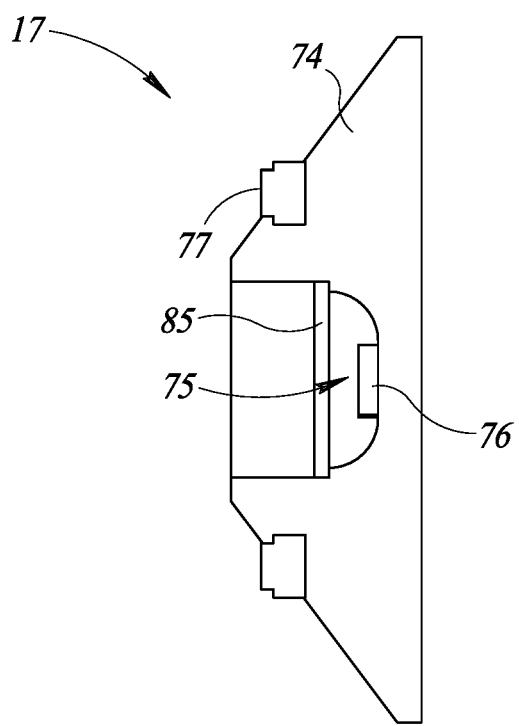
FIG. 7 is a cross-sectional view of the end cap assembly of FIG. 2, taken along lines 7-7.

As illustrated in FIGS. 2-4 in more detail, each cartridge 12 is radially spaced apart from each other about a central axis 24 of the 3D printing pen 10. In some embodiments, the angular spacing of each cartridge 12 may be equal or unequal. Each cartridge nozzle 20 extends from an end of the respective cartridge body 19 and is sized and shaped to taper down from the end of the cartridge body 19 terminating in a cartridge tip 25. The cartridges 12 are each coupled, at least in part, to a dispensing apparatus 14 via a mounting plate 26. In general, the dispensing apparatus 14 is communicatively coupled to the controller 11 and configured and/or operable to dispense the one or more colored thixotropic paste(s) 18 to the dynamic mixing apparatus 16, as described in more detail below.

The dispensing apparatus 14 includes a motor unit 28. The motor unit 28, in some embodiments, may include one or more stepper motors 29 (e.g., stepper motors 29a, 29b, 29c, 29d, 29e, collectively or individually referred to as stepper motor 29) coupled to each cartridge 12. As shown in more detail in FIG. 4, each of the one or more stepper motors 29 may be coupled with a lead screw 30 for example via a coupling 34, as shown in more detail in FIG. 4. The lead screw 30 is received in the cartridge body 19 and is coupled to a plunger 31. Thus, as the one or more stepper motor 29 rotates, such rotation drives the lead screw 30 in an axial direction, indicated by arrow X. As described above, the lead screw 30 is coupled to the plunger 31. As the lead screw 30 is driven, such causes axial movement of the plunger 31. The plunger 31 includes a head or a plunger seal that sealingly engages with an interior surface of the cartridge body 19 to dispense or expel the colored thixotropic paste 18 through the cartridge nozzle 20. In particular, proximal movement of the plunger 31 may create a positive pressure in the cartridge body 19 to expel or dispense the colored thixotropic paste 18.

While in one embodiment illustrated in FIGS. 2-10, the motor unit 28 includes stepper motors 29, in other embodiments, the motor unit 28 may include a DC motor, solenoid, relay or some other electromechanical or magnetic actuator that may drive or axially move the plunger 31 in order to expel or dispense the color thixotropic paste 18.

As described above, the dispensing apparatus 14 is coupled, at least in part, to the cartridges 12 via mounting plate 26. In particular, the mounting plate 26 is coupled to the stepper motors 29 via the coupling 34. The mounting plate 26 includes a plurality of coupling apertures 33 that are radially spaced apart about the central axis 24. Each coupling aperture 33 is sized and shaped to receive therethrough the coupling 34. Each coupling 34 is generally hollow and sized and shaped to coupleably receive a head of the lead screw 30 and an output shaft 35 of the stepper motor 29.

Each cartridge 12 is coupled to the dynamic mixing apparatus 16, wherein the dynamic mixing apparatus 16 is communicatively coupled to the controller 11 and, generally, selectively dynamically mixes, blends, and/or distributes the different colored thixotropic pastes 18. In particular, as shown in more detail in FIGS. 8-10, the dynamic mixing apparatus 16 includes a mixing rotor 36, a rotor hub 37, a rotor housing 39, mixing tip 41, and a mixing housing 42. The rotor hub 37 includes a plurality of coupling members 43 that protrude outwardly from an exterior surface. Each coupling member 43 is radially spaced from apart from each other about the central axis 24. Each coupling member 43 includes an aperture 44 extending therethrough. The aperture 44 is sized and shaped to coupleably receive therethrough a corresponding cartridge nozzle 20, which fluidly communicatively couples the rotor hub 37 and, more generally, the dispensing mixing apparatus 14 to the dynamic mixing apparatus 16, to fluidly receive the color thixotropic paste 18. The rotor hub 37 further includes a plurality of radially spaced apart channels 45. Each channel 45 extends from the aperture 44 radially toward a center of the rotor hub 37. In this manner, the channel 45 is fluidly communicatively coupled to the cartridge nozzle 20 via the aperture 44.

In or around a center of the rotor hub 37, a shaft aperture 46 extends therethrough. The shaft aperture 46 is sized and shaped to receive therethrough the mixing rotor 36. In particular, the mixing rotor 36 includes a mixing rotor shaft 47 coupled to a plurality of radially spaced apart mixing blades 48. The mixing rotor 36 is coupled to a mixer motor unit 49. The mixer motor unit 49 is communicatively coupled to the controller 11, and is generally selectively configured and/or operable to drive and/or rotate the mixing rotor shaft 47 and, consequently, the mixing blades 48 to mix, blend, and/or distribute the color thixotropic pastes 18. In particular, in some embodiments the mixer motor unit 49 may comprise a brushed DC gear motor having a wide range of gear ratios, for example, from 5:1 to 1000:1. In particular, the gear ratios may be selected based on the desired output torques.

In some embodiments, the mixer motor unit 49 may have an integral controller or may be operably coupled to an external controller, such as, for example, controller 11, that includes a pulse width modulation (PWM) controller or module, for example. PWM is a modulation technique that controls the width of a control pulse based on modulator signal information. For example, the PWM controller or module may be operable with a variable speed and/or torque electric motor. In one embodiment, the PWM controller or module may operate by driving the mixer motor unit 49 with a series of ON and OFF pulses and varying a duty cycle, i.e., a fraction of time that an output voltage is ON compared to when the output voltage is OFF, of the series of pulses while a frequency constant. As an example, the power applied to the mixer motor unit 49 may be controlled by varying a width of the series of applied pulses, which may vary an average DC voltage applied to motor terminals. Thus, by modulating timing of the series of pulses, a speed, i.e., RPM, of the mixer motor unit 49 may be selectively controlled. In other words, the longer the pulse is ON, the faster the mixer motor unit 49 may rotate. Conversely, the shorter the pulse is ON, the slower the mixer motor unit 49 may rotate.

In some embodiments, the mixer motor unit 49 may be selected to operate at low PWM frequencies, which may maximize or optimize the output torque. For example, the PWM frequency of the PWM controller of the mixing motor unit 49 may be set at 5 hertz (Hz).

As described above, the mixer motor unit 49 includes a plurality of gears 50 that are sized and shaped to provide a wide range of gear ratios from between 5:1 to 1000:1. The mixer motor unit 49 includes a mixer motor shaft 51 whose output is controlled by the gears 50. The mixer motor shaft 51 is coupled to the mixing rotor 36, in particular, the mixing rotor shaft 47, via a mixer coupler 52. Thus, the mixer motor unit 49 controllably drives the mixing rotor 36 by rotatably moving the mixing rotor shaft 47 via the mixer motor shaft 51.

The mixer motor unit 49 is positioned between the radially spaced apart cartridges 12. In particular, the mixer motor unit 49 is coupled to the cartridges 12 via a mixer mounting plate 54. The mixer mounting plate 54 includes a plurality of radially spaced apart cartridge apertures 55. Each cartridge aperture 55 is sized and shaped to coupleably receive the cartridge body 19, such that the cartridge nozzle 20 protrudes outwardly beyond the cartridge aperture 55. Proximal to a center of the mixer mounting plate 54, a central recess 56 is provided which extends to a mixer bracket 57. At least a portion of the mixer motor unit 49 extends through the central recess 56 and is secured or mounted to the mixer bracket 57. As illustrated in detail in FIGS. 2 and 4, for example, the mixing motor shaft 51 coupled to the mixing rotor shaft 47 via the mixer coupler 52 is centrally positioned relative to the radially spaced apart coupling members 43 of the rotor hub 37. The rotor hub 37 may include one or more hub flanges 59 that may be sized and shaped to couple to the housing 13 (shown only partially for clarity of description and illustration) of the 3D printing pen 10. The rotor hub 37 further includes a plurality of radially spaced apart coupling apertures 60. The coupling apertures 60 are sized and shaped to align with a plurality of rotor housing apertures 61 disposed in the rotor housing 39. In this manner, the rotor hub 37 may be coupled to the rotor housing 39 via fasteners (not shown for the sake of clarity of illustration and description).

The rotor housing 39 includes a plurality of mixer apertures 62 that are positioned proximal to a rotor aperture 63 that is sized and shaped to receive the mixing rotor shaft 47 therethrough. In particular, the mixer apertures 62 are radially spaced apart about the central axis 24 of the 3D printing pen 10 about which the mixing rotor shaft 47 extends. Each mixer aperture 62 is fluidly communicatively coupled to a corresponding channel 45 of the rotor hub 37. In this manner, the color thixotropic paste 18 of a respective cartridge 12 flows from the channels 45 to the mixer apertures 62 and through the mixer apertures 62.

Toward a lower end, the rotor housing 39 includes a chamber flange 64 that extends circumferentially. The chamber flange 64 is sized and shaped to couple to the mixing housing 42. In particular, when the chamber flange 64 is coupled to the mixing housing 42, such defines a mixing chamber 66. Each of the mixer apertures 62 extends to the mixing chamber 66. The mixing chamber 66 is also sized and shaped to receive therein the mixing blades 48. As the color thixotropic paste 18 flows into the mixing chamber 66 through the mixer apertures 66, the mixing blades 48 may be selectively and controllably rotated or spun by being driven by the mixer motor unit 49 to provide an appropriate mix ratio of the color thixotropic pastes 18 to obtain a desired color output thixotropic paste 9. By way of example and without limitation, an orange color may be produced with a CMYKW value of C:0, M:0.69, Y:1.0, K:0, and W:0. Again, other colors may be produced by appropriate CMYKW values.

Figure 8:
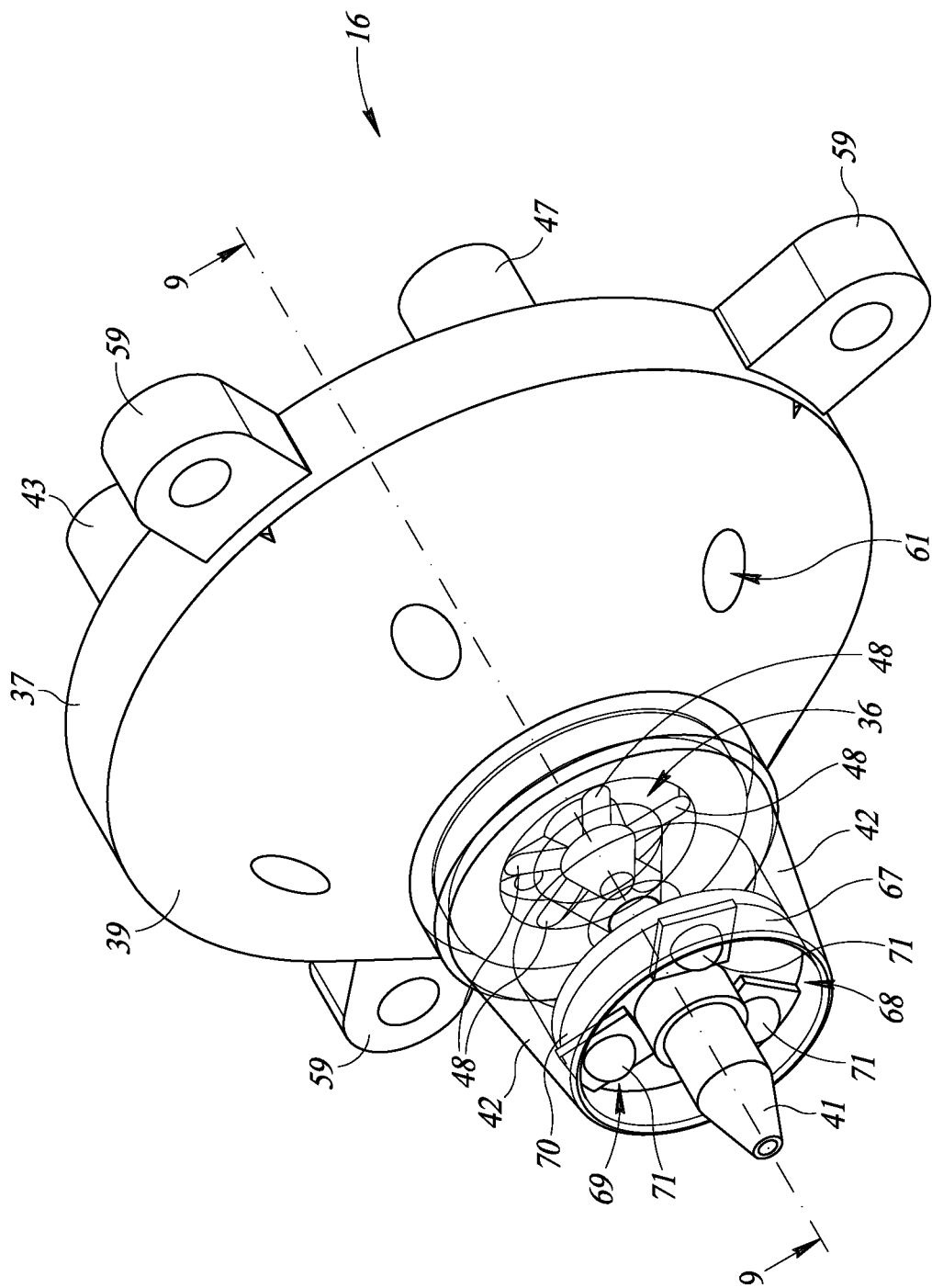
FIG. 8 is an isometric view of a dynamic mixer assembly of the 3D printing pen of FIG. 2, according to one example, non-limiting embodiment.
Figure 9:
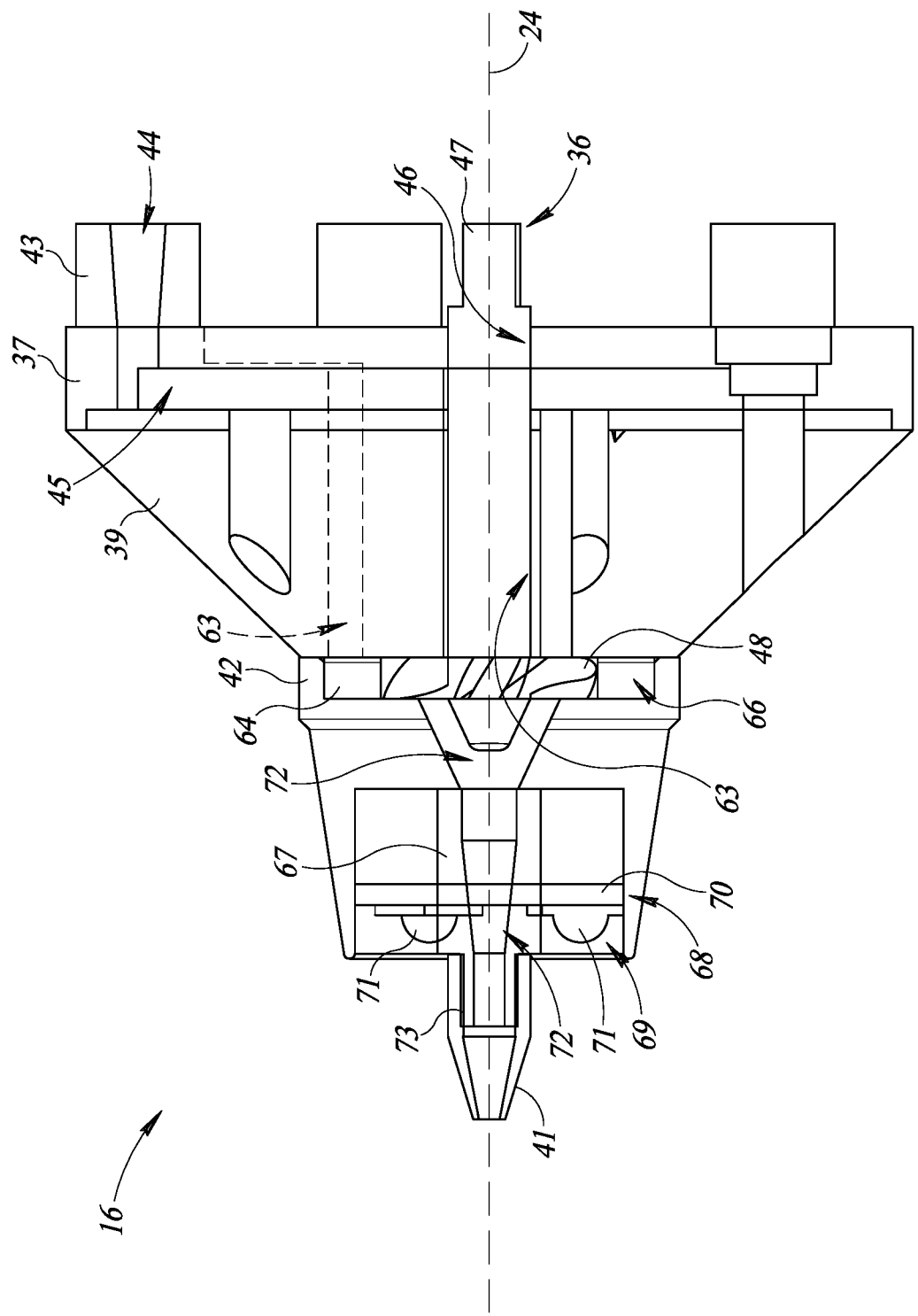
FIG. 9 is a cross-sectional view of the dynamic mixer assembly of FIG. 2, taken along lines 9-9.
Figure 10:
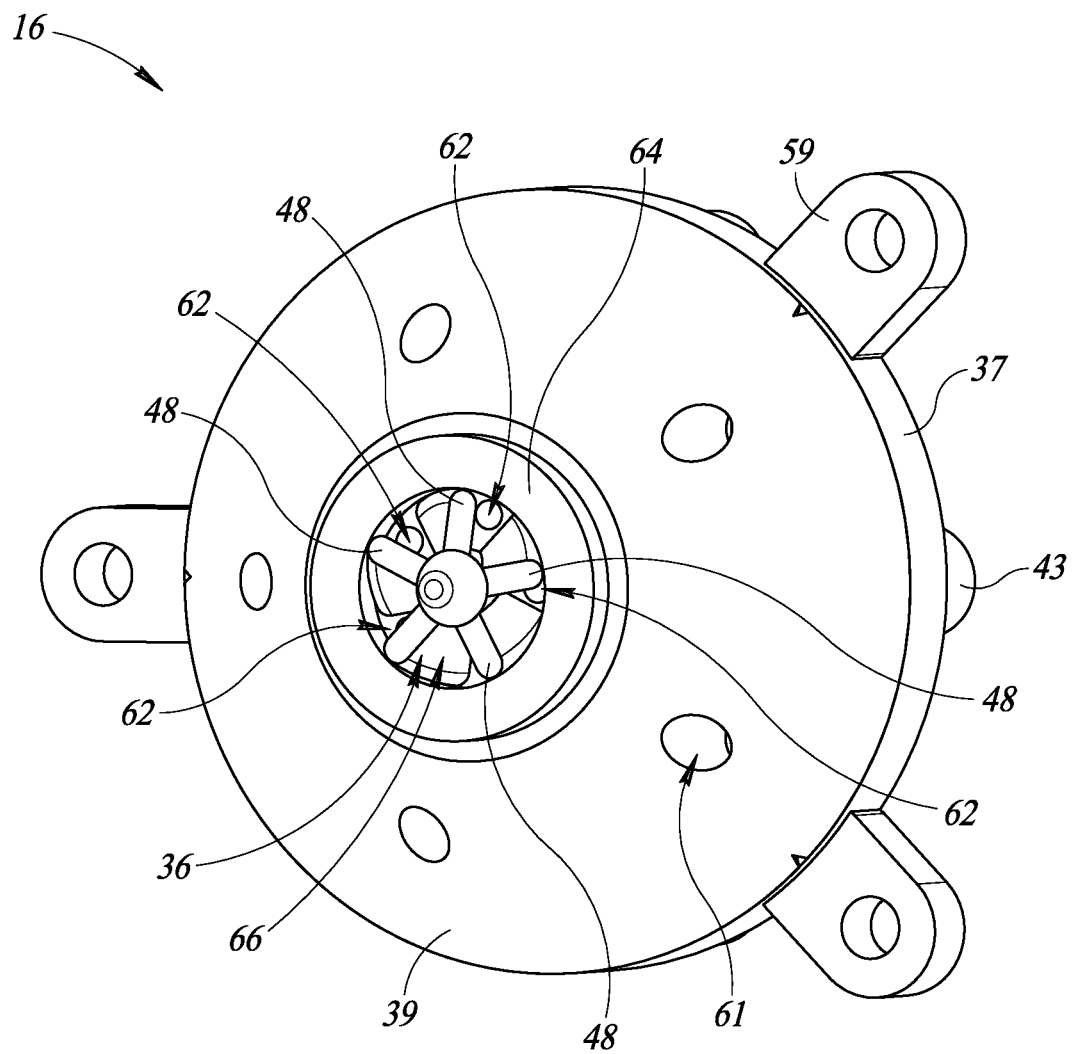
FIG. 10 is an isometric view of the dynamic mixer assembly of FIG. 2, with certain components, e.g., mixing tip, mixing housing, removed for clarity of description and illustration.

As illustrated in more detail in FIGS. 8-10, the mixing housing 42 has a generally cone-shaped structure. The mixing housing 42 is generally hollow and includes a support member 67 that protrudes outwardly. The support member 67 is positioned within the cone-shaped structure of the mixing housing 42. The support member 67 is sized and shaped to couple thereto a projection module 68. The projection module 68 includes a curing light engine assembly 69 and a projection module controller 70 and associated circuitry in the form of a printed circuit board. The light engine assembly 69, in some embodiments, includes a plurality of radially spaced apart light sources 71. For example, in one embodiment, the light sources 71 comprise LED light sources, which emit light at a desired wavelength to cure the forming material, for example, the output thixotropic paste 9. In some embodiments, the wavelength used by the projection module 68 may be 400-410 nanometers. Of course, other wavelength light sources ranging, by way of example, from 365-700 nanometers may be used for curing different forming materials, or the desired output thixotropic paste 9.

As previously described, different forming materials are activated by different types of energy. For example, in one embodiment, each light source 71 may emit UV or visible light or any other light having an appropriate wavelength based on the properties of forming material, e.g., output thixotropic paste 9, to activate the forming agent. Further, it will be appreciated by one of ordinary skill in the art, upon review of the present disclosure, that when a forming material or agent is used that requires other forms of energy, e.g., infrared light, laser light, X-rays, gamma radiation and the like, the projection module 68 may be modified to generate and output such required energy. Therefore, for example, when infrared is projected onto the forming agent, the appropriate hardware and software must be employed so that the projector can generate and project such infrared light. Likewise, if X-rays or gamma radiation is used, the projector may be replaced entirely by an energy emitter that can produce and emit the appropriate energy format onto the forming agent.

In one embodiment, an appropriate wavelength based on the forming material properties produced by the projection module 68 and projected onto the forming material is generated by a driver circuit of the projection module controller 70, communicatively coupled to the controller 11, that controls a plurality of Light Emitting Diodes (LED), each diode being of the same UV or visible wavelength; for example, the wavelength may be 365, 385 or 400 nm center wavelength. In operation, the driver circuit is modified by software and/or hardware to activate and/or deactivate one or more of the light sources 71, for example, the LED light sources.

The mixing housing 42 includes a chamber aperture 72 disposed in the support member 67 that is substantially coaxial with the central axis 24 that extends through the mixing housing 42. The chamber aperture 72 includes a portion that generally tapers down proximal to the mixing chamber 66. Thereafter, the chamber aperture 72 includes a substantially straight portion that defines an outer periphery of the support member 67 in a form of a tip flange 73. The tip flange 73 is generally hollow to fluidly communicatively couple to the mixing chamber 66. The tip flange 73 is generally flexible and/or is non-transmissive to the curing light. In some embodiments, the tip flange 73 may comprise silicone rubber. The tip flange 73 is sized and shaped to coupleably receive the mixing tip 41. In this manner, the chamber aperture 72 is fluidly and communicatively coupled with the mixing chamber 66 such that the mixed and/or blended color thixotropic pastes 18 are dispensed or expelled through the mixing tip 41, for example in the form of the output thixotropic paste 9.

The end cap assembly 17 is positioned at one end of the 3D printing pen 10 proximate to the dispensing apparatus 14. The end cap assembly 17, as shown in more detail in FIGS. 6 and 7, includes a substantially cone-shaped end cap body 74 that includes a recess 75 disposed therein. The recess 75 is sized and shaped to receive therein one or more color sensor(s) 76 and optionally a cover plate 85. The one or more color sensor(s) 76 are generally configured to detect color or color profile of an object, for example, the color or color profile of the mixed, blended, or distributed color thixotropic pastes 18, in the form of output thixotropic paste 9, dispensed from the mixing tip 41, or another object having the color or color profile desired of the output thixotropic paste 9. More broadly, the one or more color sensor(s) 76 can take a wide variety of forms, such as comprise charge coupled devices (CCD), ceramic metal oxide sensors (CMOS), phototransistors, or photodiodes. Furthermore, each of the one or more sensor(s) 76 may be an assembly or collection of multiple such devices employing visible filters or neutral density filters at the optical aperture of the sensors. Additionally, this sensor may be a chip type device incorporating multiple such sensors and color filters in a single package. Arrays packaged in this manner may incorporate a means of changing gain settings to modify the luminous flux output characteristics of the device via pin jumper settings. Sensors, sensor arrays, or sensor assemblies are generally capable of communicating with a controller via an analog or digital interface. The one or more color sensor or sensors 76 may employ a transimpedance circuit to convert discreet current outputs to voltages and an integrated analog to digital converter circuit to combine the outputs of multiple sensors on a single digital or serial interface.

The one or more color sensors 76 are communicatively coupled to an LED ring 77 mounted around the end cap body 74. The LED ring 77 may include a plurality of light sources in the form of LEDs, with each one illuminating in a certain color. More particularly, the one or more color sensors 76 communicate with the LED ring 77 to indicate the color sensed which may cause one of the light sources of the LED ring 77 that substantially matches the color sensed to illuminate. In this manner, the 3D printing pen 10 may communicate to a user by illuminating an appropriate light source of the LED ring 77 the color of the dispensed mixed colored thixotropic pastes 18, or output thixotropic paste 9. In some embodiments, the end cap assembly 17 may optionally include one or more white light sources, for example, white LED(s). The one or more white LED(s) may be positioned within the LED ring 77 to illuminate certain objects and/or samples that may be positioned distant from the 3D printing pen 10. For example, if the object and/or sample is too large to fit within a recess of the sampling area and/or when the white LED near the one or more color sensors 76 is insufficient in brightness to properly illuminate the object and/or sample, the one or more white LED(s) may illuminate the object and/or sample with sufficient brightness or clarity.

The 3D printing pen 10 also includes a power source 78 that supplies or delivers power to one or more components of the 3D printing pen 10. For example, in some embodiments, the power source 78 may take the form of a battery compartment 79 that is sized and shaped to receive one or more electrical energy storage devices, for example, individual lithium-ion batteries or alkaline batteries that are packaged together to provide electrical power. More generally, such a battery compartment 79 includes electrical components that make electrical connection between the one or more individual lithium-ion batteries and primary negative and positive electrical terminals of the battery compartment 79. The negative and positive electrical terminals of the battery compartment 79 can be connected to corresponding negative and positive electrical terminals of various components of the 3D printing pen 10 to provide electrical power to such components. In some embodiments, the 3D printing pen 10 may optionally also include one or more ports. For example, the 3D printing pen 10 may include an external device port and a charging port. The external device port can be a USB port, a mini USB port, or another serial or parallel port that allows the 3D printing pen 10 to communicate with an external device, such as a personal computer, mobile device, etc. The charging port can allow the 3D printing pen 10 to be coupled to an external power source. For example, the external power source can supply electrical power to charge the one or more electrical energy storage devices received in a battery compartment 79 of the 3D printing pen 10 or, alternatively, directly supply or deliver power to the 3D printing pen 10 from the external source.

The controller 11 of the 3D printing pen 10 is generally operable to control and/or drive one or more operational aspects of the 3D printing pen 10. The controller 11 may take a variety of forms which may include one or more integrated circuits, integrated circuit components, digital circuits, digital circuit components, analog circuits, analog circuit components, and various combinations thereof. The controller 11 may include a microcontroller, digital signal processor, programmable gate array (PGA) or application specific integrated circuit (ASIC), non-transitory computer- or processor-readable memory such as a read only memory (ROM) and/or random access memory (RAM), and may optionally include one or more gate drive circuits. The controller 11 is operably and communicatively coupled to one or more sensors disposed in, on, or around the 3D printing pen 10. For example, the 3D printing pen 10 includes a force sensor 80 which is coupled to a button 81 disposed in the housing 13. In some embodiments, a low-action push button switch may be positioned below the force sensor 80 to provide tactile feedback to the user to know whether dispensing is on or off. In some embodiments, as described in more detail below, a force sensing resistor may be provided where a force sensing resistor value is averaged over time to control the overall dispense rate of mixed colored thixotropic paste.

The force sensor 80 generally measures the extent of inward force made by a human operator on an interface or body of the button 81, for example, in the form of a force sensing resistor. A signal is produced in response to the measured force, such as digital signal in digital output, and is communicated to the controller 11. The signal alone or in combination with processor executable instructions of the controller 11, for example, correlates the measured force with a dispense rate of the overall mixed colored thixotropic pastes 18, or the output thixotropic paste 9. The controller 11, thereafter, communicates with the one or more stepper motors 29 of the motor unit 28 to expel or dispense the colored thixotropic paste 18 disposed in each cartridge 12 at appropriate dispense rate and ratio to match the dispense rate of the overall mixed colored thixotropic pastes 18, e.g., output thixotropic paste 9, and the desired color into the mixing chamber 66 and, subsequently, to an environment via the mixing tip 41.

In some embodiments, if no mixing of the colored thixotropic pastes 18 is desired, for example, in an instance where only one of the CMYKW colors is desired, the output thixotropic paste 9 may include a single colored thixotropic paste 18 that may be dispensed through the mixing tip 41. In other instances, where mixing of the colored thixotropic pastes 18 is desired to obtain a desired color, the controller 11 communicates with the mixer motor unit 49 to spin or rotate the mixing blades 48, as described above, to form the mixed colored thixotropic pastes 18, e.g., output thixotropic paste 9, in the desired color. Again, each colored thixotropic paste 18 may be dispensed to the mixing chamber 66 at an appropriate dispense rate and appropriate ratio to be mixed therein and dispensed through the mixing tip 41 at the overall dispense rate based on the force applied to the button 81 and measured by the force sensor 80.

As the mixed colored thixotropic pastes 18, e.g., the output thixotropic paste 9, are dispensed through the mixing tip 41, the controller 11 communicates with the light engine assembly 69 of the projection module 68 to transmit a light, invisible or visible, of a certain wavelength. In particular, as described above, the mixed colored thixotropic pastes 18, or an unmixed, singular thixotropic paste 18, include certain resins that include photoinitiators that absorb a certain wavelength of light, which initiates a crosslinking photopolymerization process. The controller 11 can selectively send control signals to one or more of the light sources 71 of the light engine assembly 69 to transmit a light of certain wavelength which cures the resin(s) of the dispensed mixed or unmixed colored thixotropic paste(s) 18 until a desired object is formed.

As described above, the 3D printing pen 10 includes one or more color sensor(s) 76. The one or more color sensor(s) 76 is also communicatively coupled to the controller 11. In some embodiments, the one or more color sensor(s) 76 may be used to sense a color that is desired as an output color of the colored thixotropic pastes 18. For example, an operator or user, may position the 3D printing pen 10 proximate or adjacent to an object or portion thereof having the desired output color, or the 3D printing pen 10 may tap the object or portion thereof having the desired output color. The one or more color sensor(s) 76 can sense the desired output color and communicate with the controller 11 by sending a control signal indicative of the sensed color. In particular, the controller 11 converts a Red, Green, and Blue ("RGB") color model of the sensed color to a CMYKW color model. As described above, the controller 11 thereafter may communicate the desired output color to the one or more of the stepper motors 29 to dispense the colored thixotropic paste(s) 18 as described above when force is applied to the button 81.

As described above, in some embodiments, the one or more color sensor(s) 76 may communicate with the LED ring 77, which may cause the LED ring 77 to illuminate one of the light sources thereof in a color or color profile that substantially matches the sensed color. In particular, the controller 11 is communicatively coupled to the LED ring 77, such that the controller 11 sends a control signal to the LED ring 77 based on the color sensed by the one or more color sensor(s) 76 to illuminate one of the light sources of the LED ring 77. In some embodiments, the 3D printing pen 10 may also optionally include a potentiometer and an adjustment mechanism, for example, in a form of a knob. The adjustment mechanism can be configured or operable to select one or more colors of the light sources of the LED ring 77. In particular, the adjustment mechanism can be coupled to the potentiometer, such that the potentiometer detects the position of the adjustment mechanism in relation to selected the light source of the LED ring 77 based on the desired output color. The potentiometer is communicatively to the controller 11 and sends an output control signal indicative of the selected light source of the LED ring 77 based on the desired output color.

In some embodiments, as described above, the knob may function to provide manual color selection, where the knob can be continuously and selectively rotated through an array or plurality of visible colors. In some embodiments, a secondary adjustment mechanism, for example, in the form of a secondary knob may be provided which allows for adjustment of brightness and saturation via a fixed range potentiometer with center detent, in lieu of a continuous potentiometer. The secondary knob can control the addition of a certain color, for example, black (or K) by being moved counter clockwise from the center detent. Conversely, moving the secondary knob in a clockwise direction from the center detent may control the addition of a different color, for example, white (W). As the secondary knob is rotated toward the extreme counter clockwise position, the Cyan, Magenta, and Yellow values may be reduced by the communicably coupled controller 11 to zero resulting in pure black color (K). Similarly, as the secondary knob is rotated toward the extreme clockwise position, the Cyan, Magenta, and Yellow values are reduced to zero resulting in pure white (W) color. In some embodiments, a calibration button in the endcap assembly 17 may be provided to initiate the color sensing or color selection process.

Thereafter, as described above, the controller 11 may communicate the desired output color to the one or more of the stepper motors 29 to dispense the colored thixotropic paste(s) 18 as described above when force is applied to the button 81.

In some embodiments, the 3D printing pen 10 may also optionally include one or more motion sensor(s) 84. The one or more motion sensor(s) 84 can take a wide variety of forms, for example, a gyroscope, an accelerometer, a magnetometer, contact switches, and/or another inertial measurement unit (IMU). In particular, the one or more motion sensor(s) 84 can sense or capture a position of the 3D printing pen 10. For example, the one or more motion sensor(s) 84 can determine whether the mixing tip 41 of the 3D printing pen 10 is in a substantially upright position, e.g., the mixing tip 41 is facing away from a working surface upon which the desired object is to be formed. In such a position, the controller 11 communicably coupled to the one or more motion sensor(s) 84 may not initiate or activate the 3D printing pen 10. Conversely, if the mixing tip 41 is facing the working surface, whether at an angle or orthogonal to the working surface, the one or more motion sensor(s) 84 may communicate with the controller 11 to activate the 3D printing pen 10.

Figure 11:
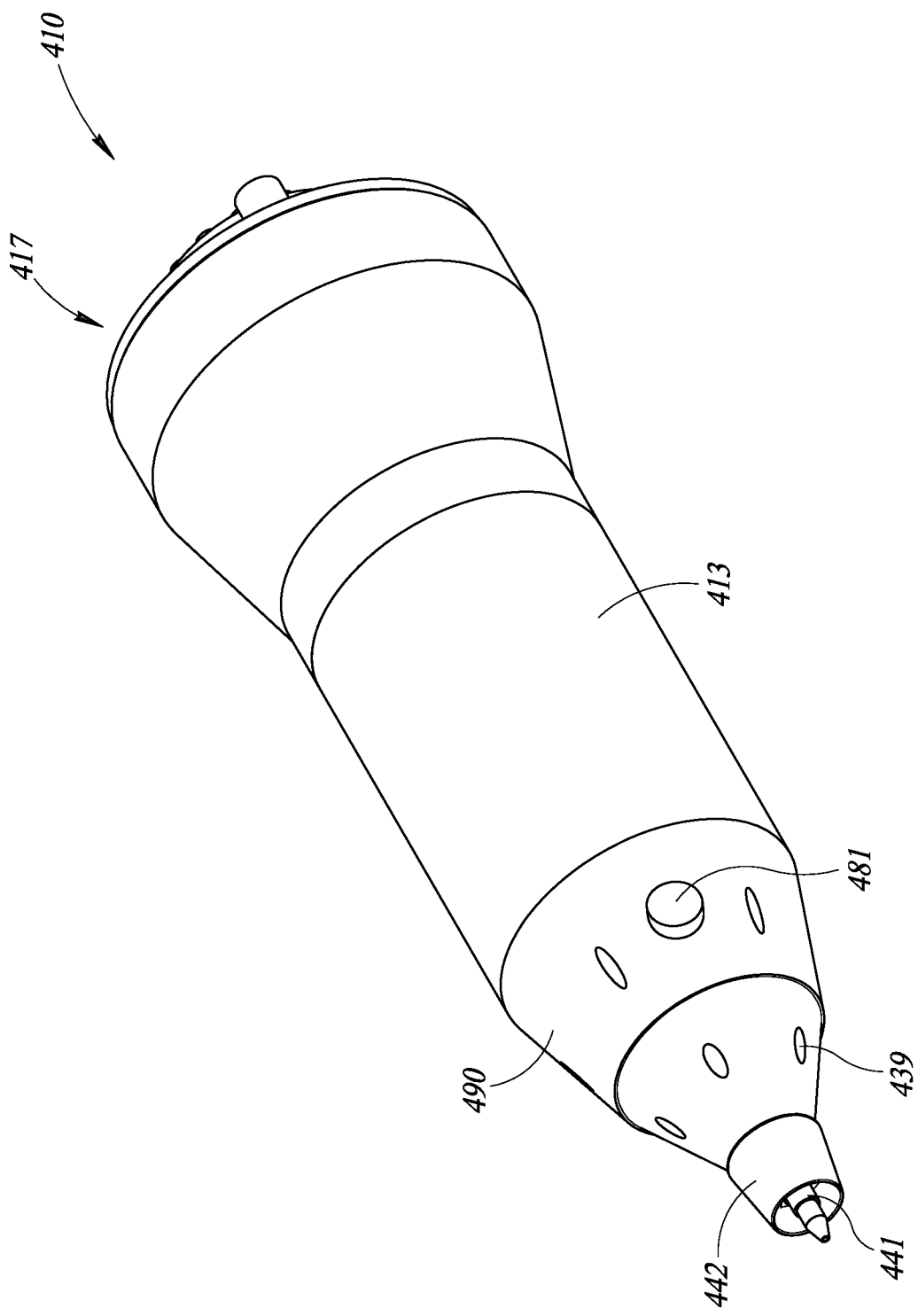
FIG. 11 is an isometric view of a 3D printing pen, according to one example, non-limiting implementation.
Figure 12:
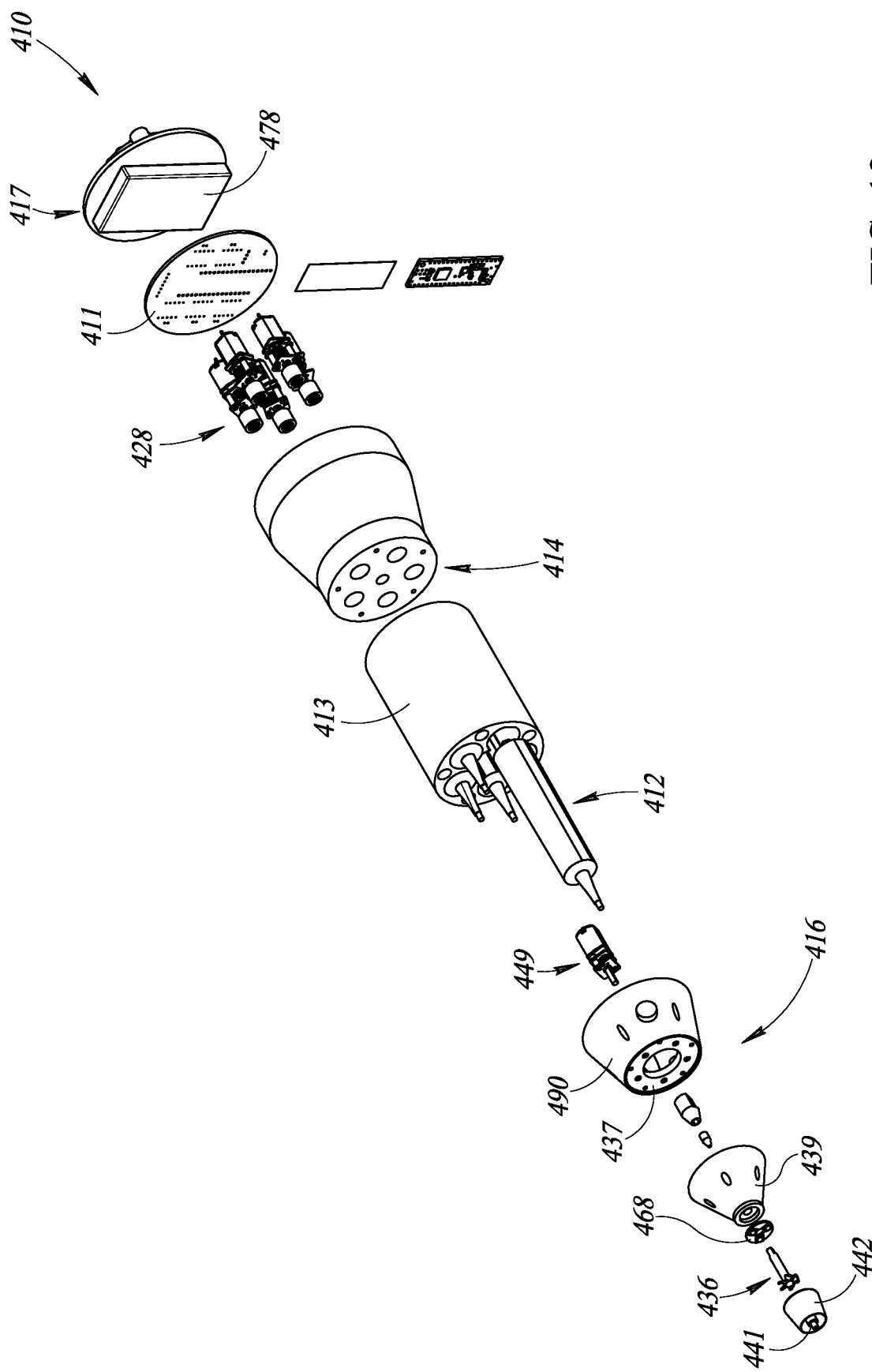
FIG. 12 is a partially exploded view of the 3D printing pen of FIG. 11.
Figure 13:
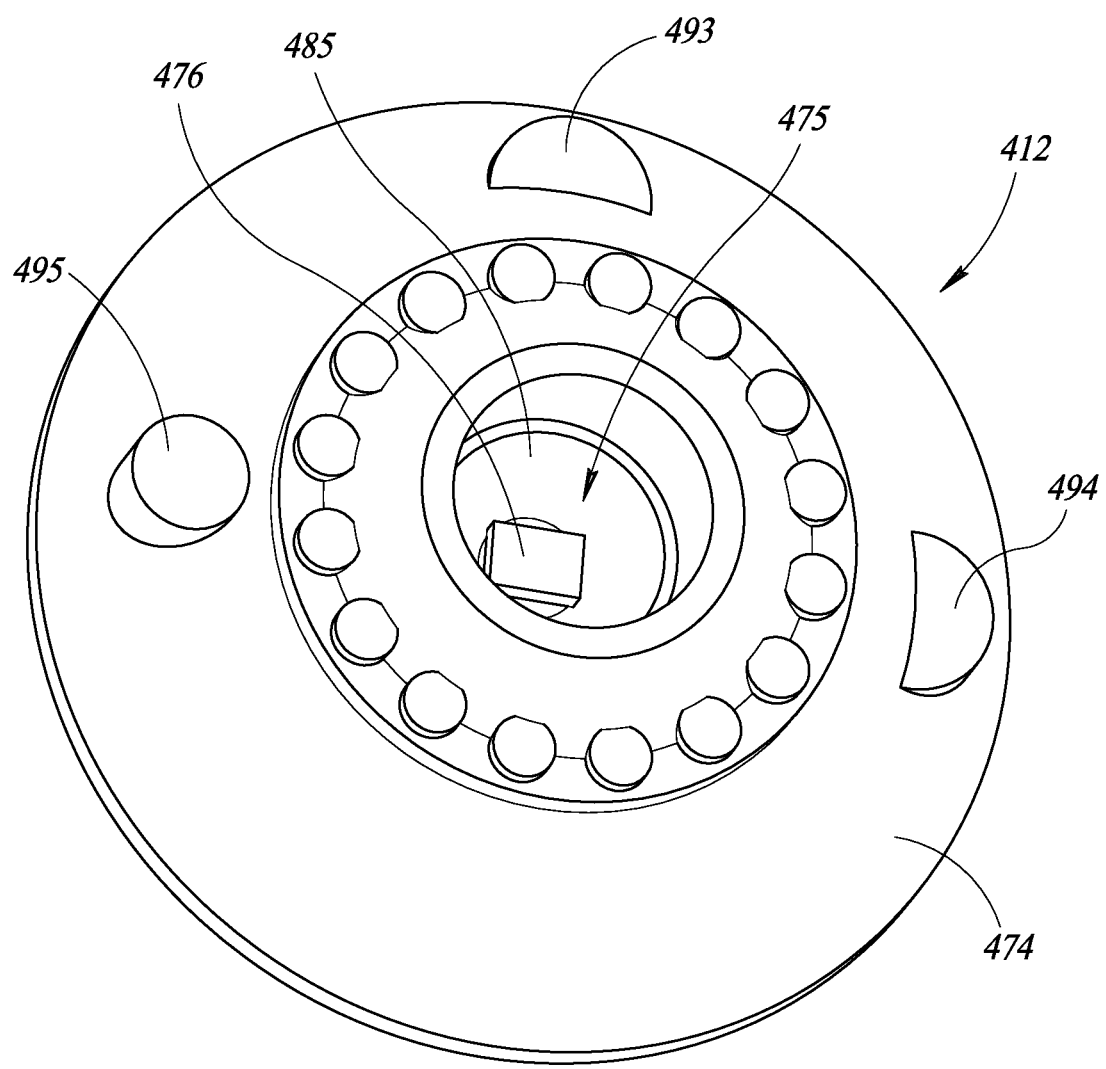
FIG. 13 is an isometric view of an end cap assembly of the 3D printing pen of FIG. 11, according to one example, non-limiting embodiment.

FIGS. 11-13 illustrate a 3D printing pen 410, according to one example, non-limiting embodiment. The 3D printing pen 410 is generally similar to the 3D printing pen 10 illustrated in FIGS. 2-10, and as described above, capable of dispensing thixotropic paste(s) of multiple colors simultaneously, dynamically mixing the thixotropic paste(s) of multiple colors at suitable and/or desired ratios, and/or curing the dispensed material to form a desired three-dimensional object, among other things described in more detail below.

The 3D printing pen 410 includes a controller 411, a plurality of cartridges 412, a dispensing apparatus 414, a dynamic mixing apparatus 416, and an end cap assembly 417. The 3D printing pen 410 includes a housing 413 that is sized and shaped to house, either fully or in part, each of the components of the 3D printing pen 410. As illustrated in FIGS. 11-13, the housing 413 may include one or more individual housing components that are coupled together to form the housing 413. In some embodiments, the one or more individual housing components may be fastened, welded, adhered together, or may be integrally formed as a monolithic housing structure. A lower portion 490 of the housing 413, includes a button 481, which is similar to the button 81, and generally operable to dispense an output colored paste, e.g., output colored paste 9. Again, the 3D printing pen 410 may include a force sensor which is coupled to the button 481 and disposed in the housing 413.

Again, as described above, a force sensing resistor or a button switch may be provided.

As described above, the dispensing apparatus 414 includes a motor unit 428. The motor unit 428, in some embodiments, may include one or more stepper motors coupled to each cartridge 412. For example, each of the one or more stepper motors may be coupled with a lead screw received in a cartridge body and coupled to a plunger. Thus, as the one or more stepper motor rotates, such rotation drives the lead screw and the plunger to dispense or expel the colored thixotropic paste.

As described above, the dynamic mixing apparatus 416 includes a mixing rotor 436, a rotor hub 437, a rotor housing 439, mixing tip 441, and a mixing housing 442. Again, the 3D printing pen 414 also includes a mixing motor unit 449, a power source 478, and a projection module 468.

As shown in FIGS. 11-13, the end cap assembly 417 is positioned at one end of the 3D printing pen 410 proximate to the dispensing apparatus 414. The end cap assembly 417, as shown in more detail in FIG. 13, includes a substantially cone-shaped end cap body 474 that includes a recess 475 disposed therein. The recess 475 is sized and shaped to receive therein one or more color sensor(s) 476 and optionally a cover plate 485. The one or more color sensor(s) 476 are generally configured to detect color or color profile of an object, for example, the color or color profile of the mixed, blended, or distributed color thixotropic pastes, in the form of output thixotropic paste, dispensed from the mixing tip 441, or another object having the color or color profile desired of the output thixotropic paste.

An LED ring 477 is mounted around the end cap body 474. The LED ring 477 may include a plurality of light sources in the form of LEDs, with each one illuminating in a certain color. As described above, the one or more color sensors 476 communicate with the LED ring 477 to indicate the color sensed which may cause one of the light sources of the LED ring 477 that substantially matches the color sensed to illuminate. Again, in some embodiments, the end cap assembly 417 may optionally include one or more white light sources, for example, white LED(s). The one or more white LED(s) may be positioned within the LED ring 477 to illuminate certain objects and/or samples that may be positioned distant from the 3D printing pen 410. For example, if the object and/or sample is too large to fit within a recess of the sampling area and/or when the white LED near the one or more color sensors 476 is insufficient in brightness to properly illuminate the object and/or sample, the one or more white LED(s) may illuminate the sample with sufficient brightness or clarity.

As described above, in some embodiments, the one or more color sensor(s) 476 may communicate with the LED ring 477, which may cause the LED ring 476 to illuminate one of the light sources thereof in a color or color profile that substantially matches the sensed color. In particular, the controller 411 is communicatively coupled to the LED ring 477, such that the controller 411 sends a control signal to the LED ring 477 based on the color sensed by the one or more color sensor(s) 476 to illuminate one of the light sources of the LED ring 477. In some embodiments, the 3D printing pen 410 may also optionally include a potentiometer and an adjustment mechanism, for example, in a form of a knob 493. The adjustment mechanism can be configured or operable to select one or more colors of the light sources of the LED ring 477. In particular, the adjustment mechanism can be coupled to the potentiometer, such that the potentiometer detects the position of the adjustment mechanism in relation to selected the light source of the LED ring 477 based on the desired output color. The potentiometer is communicatively to the controller 411 and sends an output control signal indicative of the selected light source of the LED ring 477 based on the desired output color.

In some embodiments, as described above, the knob 493 may function to provide manual color selection, where the knob 493 can be continuously and selectively rotated through an array or plurality of visible colors. In some embodiments, a secondary adjustment mechanism, for example, in the form of a secondary knob 494 may be provided which allows for adjustment of brightness and saturation via a fixed range potentiometer with center detent, in lieu of a continuous potentiometer. The secondary knob 494 can control the addition of a certain color, for example, black (or K) by being moved counter clockwise from the center detent. Conversely, moving the secondary knob 494 in a clockwise direction from the center detent may control the addition of a different color, for example, white (W). As the secondary knob 494 is rotated toward the extreme counter clockwise position, the Cyan, Magenta, and Yellow values may be reduced by the communicably coupled controller 411 to zero resulting in pure black color (K). Similarly, as the secondary knob 494 is rotated toward the extreme clockwise position, the Cyan, Magenta, and Yellow values are reduced to zero resulting on pure white (W) color. In some embodiments, a calibration button 495 in the endcap assembly 417 may be provided to initiate the color sensing or color selection process.

Figure 14:
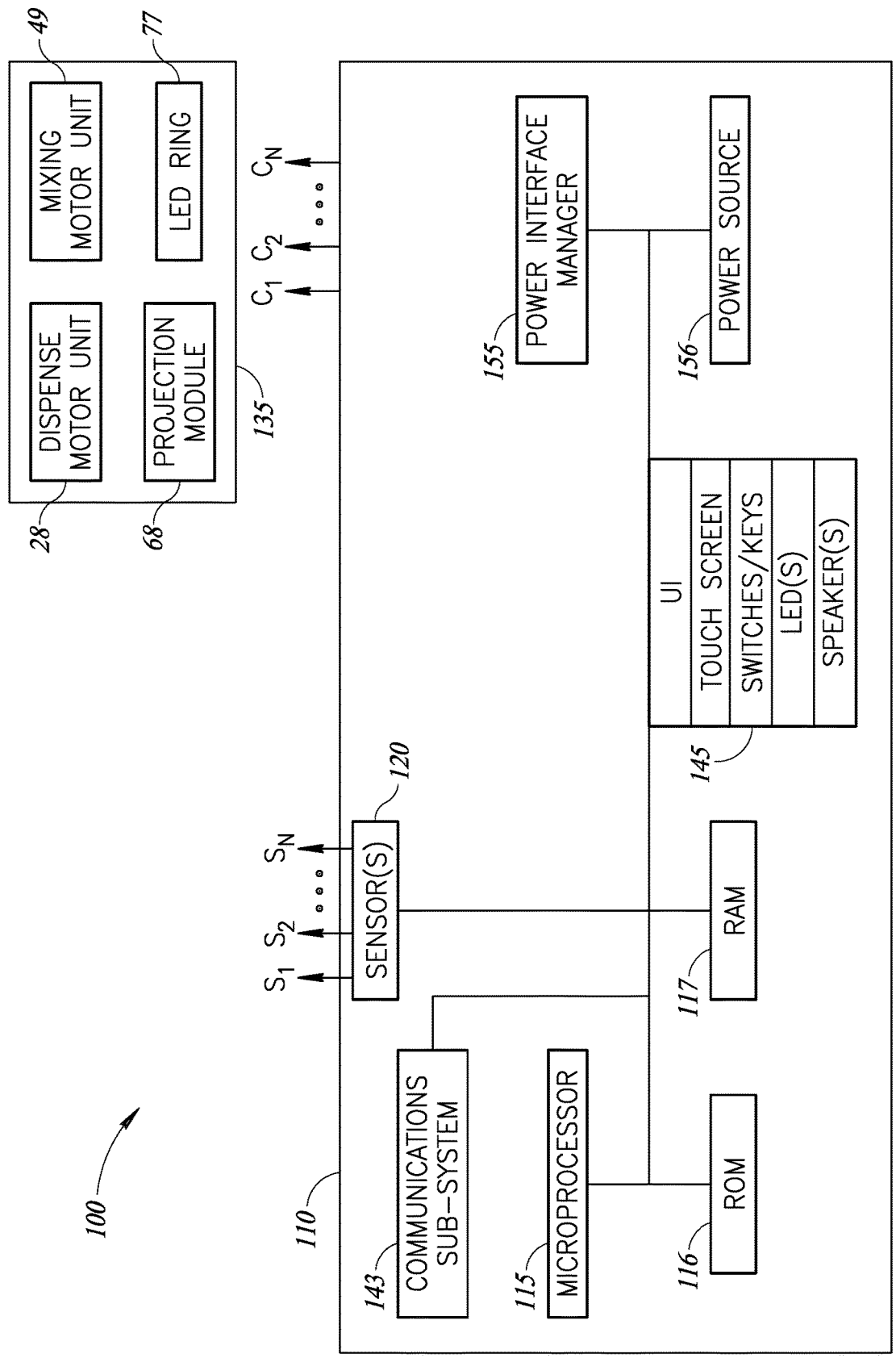
FIG. 14 is a schematic view of a three-dimensional printing system, according to one example, non-limiting implementation.

FIG. 14 schematically illustrates a 3D printing system 100, according to one example, non-limiting implementation. In particular, the 3D printing system 100 is generally operable to three-dimensionally print an object with one or more embodiments of the 3D printing pen described herein, for example, 3D printing pen 10. FIG. 14 schematically illustrates various control systems, modules, and other sub-systems that operate to form an object using the 3D printing pen. The 3D printing system 100 includes a central control sub-system 110 that can be integrated in a 3D printing pen, such as the 3D printing pens 10, 410 illustrated in FIGS. 2-10 and FIGS. 11-13, respectively.

The central control sub-system 110 includes a controller 115, for example a microprocessor, digital signal processor, programmable gate array (PGA) or application specific integrated circuit (ASIC). The controller 115 may be similar to controllers 11, 411 illustrated in FIGS. 2-10, 11-13, respectively, that is integrated in the 3D printing pen 10, 410. The central control subsystem 110 includes one or more non-transitory storage mediums, for example read only memory (ROM) 116, random access memory (RAM) 117, Flash memory (not shown), or other physical computer- or processor-readable storage media. The non-transitory storage mediums may store instructions and/or data used by the controller 115, for example an operating system (OS) and/or applications. The instructions as executed by the controller 115 may execute logic to perform the functionality of the various embodiments of the 3D printing pen described herein, including, but not limited to, logic to establish a pairing relationship with remote accessories, sense occurrence of certain events, actuate various components of a 3D printing pen, e.g., 3D printing pen 10, 410, and any various combinations thereof.

The central control sub-subsystem 110 may include one or more sensors 120 positioned, configured and operable to sense various operation characteristics of the various elements or components of the 3D printing system 100. For example, the one or more sensors 120 can include one or more color sensors, e.g., color sensor(s) 76, 476, force sensor 80, potentiometer, and motion sensor(s) 84 that are integrated in the 3D printing pen 10, 410. The one or more sensor(s) 120 are communicatively coupled via one or more internal sensor ports to provide signals represented as $S_1 \ldots S_N$ indicative of such to the controller 115, such as a microprocessor. For example, a color sensor, e.g., color sensor 76, can provide a signal to the controller 115 indicative of color detected upon positioning proximal to an object and/or by tapping on an object. The motion sensor, e.g., motion sensor 84, can provide a signal to the controller 115 indicative of positioning of the 3D printing pen, e.g., angular or orthogonal positioning of the 3D printing pen relative to a working surface, or certain gestures, such as movement of the 3D printing pen 10, 410, e.g., tapping on an object, etc. For example, the potentiometer can provide a control signal indicative of a positioning of an LED ring indicative of a color of an LED light source.

The central control sub-subsystem 110 is communicatively coupled to one or more actuators 135 to control one or more operational characteristics of the 3D printing system 100. The controller 115, typically, based on sensed conditions and programmed logic, provides control signals $C_1$-$C_N$ to actuators 135 of the 3D printing system 100. The actuators 135, in some implementations, may include a mixing motor, e.g., mixing motor unit 49, dispense motor unit, e.g., motor unit 28, projection module, e.g., projection module 68, and color indicators, e.g., LED ring 77, etc. Although the actuators 135 are referenced in FIG. 14 as including mixing motor 49, motor unit 28, projection module 68, and LED ring 77 for clarity of illustration, it is within the scope of the disclosed subject matter that the mixing motor, the motor unit, the projection module, and the LED ring may be anyone of the embodiments described herein, for example, mixing motor unit 449, motor unit 428, projection module 468, LED ring 477, etc.

For example, the controller 115 may provide a control signal, e.g., $C_1$, to the dispense motor unit 28 to cause one or more of the colored thixotropic pastes 18 to be dispensed through the cartridge 12, 412 into the mixing chamber 66 upon activation of the force sensor 80 providing a certain sensor signal to the controller 115. For example, the controller 115 may provide a control signal $C_2$ to the mixing motor unit 49 to mix, blend, or distribute the colored thixotropic pastes to obtain a desired color of the output colored paste, e.g., output colored paste 9, upon receiving a sensor signal from the one or more color sensor(s) 76 indicative of a certain sensed color. For example, the controller 115 may provide a control signal, e.g., $C_3$, to the projection module 68 to initiate or activate the light engine assembly 69 to transmit a light, invisible or visible, of a certain wavelength, via one or more of the appropriate light sources 71. For example, the controller 115 may provide a control signal, e.g., $C_4$, to the color indicators, for example, LED ring 77, to illuminate an appropriate light source to indicate the desired output color of the output thixotropic paste, e.g., output thixotropic paste 9.

The central control sub-subsystem 110 may include a user interface 145, to allow an end user to operate or otherwise provide input to the 3D printing system 100 regarding the operational state or condition of the 3D printing system 100. The user interface 145 may include a number of user actuatable controls accessible from the exterior of the 3D printing system 100. For example, the user interface 145 may be provided in the 3D printing pen 10 and may include a number of switches or keys operable to turn the 3D printing pen 10 ON and OFF and/or to set various operating parameters of the 3D printing system 100. The user interface 145 may also include one or more visual indicators, for instance light emitting diodes (LEDs). The visual indicators may be single color or may be capable of producing different color indicia corresponding to various operational states or conditions of the 3D printing system 100. For example, upon selection of the desired output color of the output thixotropic paste, the visual indicators may illuminate a number of times to indicate a selection has been made.

Additionally, or alternatively, the user interface 145 may include a display, for instance a touch panel display. The touch panel display (e.g., LCD with touch sensitive overlay) may provide both an input and an output interface for the end user. The touch panel display may present a graphical user interface, with various user selectable icons, menus, check boxes, dialog boxes, and other components and elements selectable by the end user to set operational states or conditions of the 3D printing system 100. The user interface 145 may also include one or more auditory transducers, for example one or more speakers and/or microphones. Such may allow audible alert notifications or signals to be provided to an end user. Such may additionally, or alternatively, allow an end user to provide audible commands or instructions. The user interface 145 may include additional components and/or different components than those illustrated or described, and/or may omit some components. The switches and keys or the graphical user interface may, for example, include toggle switches, a keypad or keyboard, rocker switches, trackball, joystick or thumbstick. The switches and keys or the graphical user interface may, for example, allow an end user to turn ON the 3D printing pen 10, start or end a color sensing mode, communicably couple or decouple to remote accessories, select from a number of colors, activate or deactivate motors or audio subsystems, or activate or deactivate charging, etc.

The central control sub-subsystem 110 includes a communications sub-system 143 that may include one or more communications modules or components which facilitate communications with various components of one or more external device, such as a personal computer, mobile device, etc. The communications sub-system 143 may provide wireless or wired communications to the one or more external devices. The communications sub-system 143 may include wireless receivers, wireless transmitters or wireless transceivers to provide wireless signal paths to the various remote components or systems of the one or more paired devices. The communications sub-system 143 may, for example, include components enabling short range (e.g., via Bluetooth, near field communication (NFC), or radio frequency identification (RFID) components and protocols) or longer range wireless communications (e.g., over a wireless LAN, Low-Power-Wide-Area Network (LPWAN), satellite, or cellular network), such as for receiving GPS data, and may include one or more modems or one or more Ethernet or other types of communications cards or components for doing so. The communications sub-system 143 may include one or more bridges or routers suitable to handle network traffic including switched packet type communications protocols (TCP/IP), Ethernet or other networking protocols. In some implementations, the wired or wireless communications with the external device may provide access to look-up table indicative of various color or color profiles. For example, in lieu of or in addition to determining a desired color via positioning of the 3D printing pen 10, 410 or selecting a color from the LED ring 77, an end user may select a color from a variety of colors displayed in the user interface 145, which may be stored in a look-up table or the like in the external device.

The central control sub-system 110 includes a power interface manager 155 that manages supply of power from a power source 156, e.g., power source 78, 478 to the various components of the central control sub-system 110, for example, the central control sub-system 110 integrated in the 3D printing pen 10, 410. The power interface manager 155 is coupled to the controller 115 and the power source 156. Alternatively, in some implementations, the power interface manager 155 can be integrated in the controller 115. The power source 156 may include external power supply or electrical energy storage devices that are received in the battery compartment 79 of the 3D printing pen 10. The power interface manager 155 may include power converters, rectifiers, buses, gates, circuitry, etc. In particular, the power interface manager 155 can control, limit, restrict the supply of power from the power source 156 based on the various operational states of the 3D printing system 100.

In some embodiments or implementations, the instructions and/or data stored on the non-transitory storage mediums that may be used by the controller, such as, for example, ROM 116, RAM 117 and Flash memory (not shown), includes or provides an application program interface ("API") that provides programmatic access to one or more functions of the central control sub-system 110. For example, such an API may provide a programmatic interface to control one or more operational characteristics of the 3D printing system 100, including, but not limited to, one or more functions of the sensor(s) 120, actuator controller(s) 135, and user interface 145. Such control may be invoked by one of the other programs, actuators 135, other remote device or system (not shown), or some other module. In this manner, the API may facilitate the development of third-party software, such as various different user interfaces and control systems for other devices, plug-ins, and adapters, and the like to facilitate interactivity and customization of the operation and devices within the 3D printing system 100.

In an example embodiment or implementation, components or modules of the central control sub-system 110 and other devices within the 3D printing system 100 are implemented using standard programming techniques. For example, the logic to perform the functionality of the various embodiments or implementations described herein may be implemented as a "native" executable running on the controller, e.g., microprocessor 115, along with one or more static or dynamic libraries. In other embodiments, various functions of the central control sub-system 110 may be implemented as instructions processed by a virtual machine that executes as one or more programs whose instructions are stored on ROM 116 and/or random RAM 117. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the central control sub-system 110, such as microprocessor 115, to perform the functions of the central control sub-system 110. The instructions cause the microprocessor 115 or some other processor, such as an I/O controller/processor, to process and act on information received from one or more sensor(s) 120 to provide the functionality and operations of the 3D printing system 100 described herein.

The embodiments or implementations described above may also use well-known or other synchronous or asynchronous client-server computing techniques. However, the various components may be implemented using more monolithic programming techniques as well, for example, as an executable running on a single microprocessor, or alternatively decomposed using a variety of structuring techniques known in the art, including but not limited to, multiprogramming, multithreading, client-server, or peer-to-peer (e.g., Bluetooth®, NFC or RFID wireless technology, mesh networks, etc., providing a communication channel between the devices within the 3D printing system 100), running on one or more computer systems each having one or more central processing units (CPUs) or other processors. Some embodiments may execute concurrently and asynchronously, and communicate using message passing techniques. Also, other functions could be implemented and/or performed by each component/module, and in different orders, and by different components/modules, yet still achieve the functions of the central control sub-system 110.

In addition, programming interfaces to the data stored on and functionality provided by the central control sub-system 110, can be available by standard mechanisms such as through C, C++, C#, and Java APIs; libraries for accessing files, databases, or other data repositories; scripting languages; or Web servers, FTP servers, or other types of servers providing access to stored data. The data stored and utilized by the central control sub-system 110 and overall 3D printing system may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules within the 3D printing system 100 in different ways, yet still achieve the functions of the central control sub-system 110 and 3D printing system 100.

Furthermore, in some embodiments, some or all of the components of the central control sub-system 110 and components of other devices within the 3D printing system may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 15:
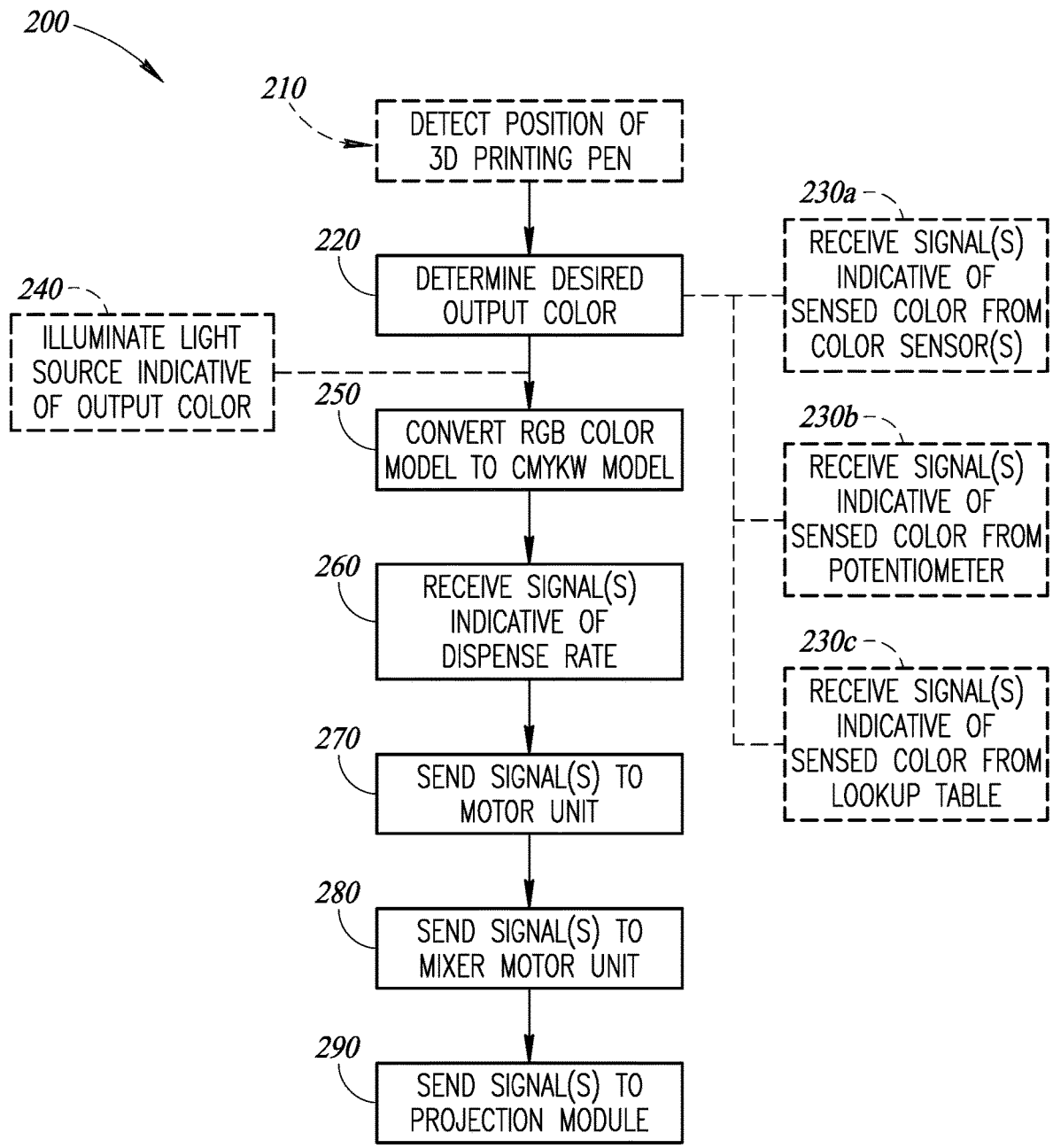
FIG. 15 is a flow diagram illustrating a high level method of operating a three-dimensional printing pen, according to one example, non-limiting implementation.

FIG. 15 is a flow diagram illustrating a high-level method 200, according to one example, non-limiting implementation. The method 200 generally illustrates various operational and/or functional characteristics of a 3D printing system, e.g., 3D printing system 100, having a 3D printing pen, e.g., 3D printing pen 10, 410. At 210, optionally, a position of the 3D printing pen is determined. For example, one or more motion sensor(s), e.g., one or more motion sensor(s) 84, communicatively indicate to a controller, e.g., controller 11, 411, 115, whether a tip of the 3D printing pen is positioned at an angle or orthogonal to a working surface. If the 3D printing pen is positioned at an angle or orthogonal to a working surface, the 3D printing pen may be in an operational state.

At 220, a desired output color of an output thixotropic paste, e.g., output thixotropic paste 9, is determined. In one implementation, the desired output color of the output thixotropic paste may be determined at 230a via the controller receiving signal(s) from one or more color sensor(s), e.g., one or more color sensor(s) 76, 476 indicative of a color sensed by positioning the 3D printing pen proximate to an object having the desired output color or by tapping on the object or portion thereof with the desired output color.

In another implementation, the desired output color of the output thixotropic paste may be determined at 230b via the controller receiving signal(s) from one or more potentiometer(s) indicative of a positioning of an adjustment mechanism, for example, in a form of a knob, as described above. Again, the adjustment mechanism may be configured or operable to select one or more colors of light sources, for example, light sources of an LED ring, e.g., LED ring 77, 477.

In another implementation, at 230c, the desired output color of the output thixotropic paste may be selected from a selection of potential colors available on a user interface of the 3D printing pen, e.g., user interface 145. Again, as described above, the 3D printing pen may be communicatively coupled to an external device having a look-up table stored therein with the selection of output colors. Further, it is also within the scope of the disclosed subject matter, that in some implementations, the method may include each one of, or any combination, of the steps described above.

At 240, optionally, the 3D printing pen, may illuminate a light source indicative of the selected output color. For example, as described above, a 3D printing pen may include an LED ring, e.g., LED ring 77, 477, wherein one of the light sources of the LED ring may be illuminated, one time or any number of times, to indicate to the end user that a certain output color has been selected.

At 250, the controller of the 3D printing pen, based on the desired output color of the output colored thixotropic paste, converts an RGB color model into a CMYKW color model.

At 260, the controller of the 3D printing pen, may receive signal(s) indicative of an output dispense rate from one or more force sensor(s), e.g., force sensor(s) 80. For example, as described above, based on pressing of a button, e.g., button 81, the force sensor(s) can detect an applied force to determine a desired overall dispense rate.

At 270, the controller of the 3D printing pen, sends signal(s) indicative of the overall dispense rate to a motor unit, e.g., motor unit 28, 428, to activate or actuate motors, e.g., stepper motors 29, of the 3D printing pen. As described above, the motor unit 28, 428, when actuated, dispenses individual colored thixotropic paste 18 disposed in a corresponding cartridge, e.g., cartridge 12, 412, through a nozzle, e.g., nozzle 20, into a mixing chamber, e.g., mixing chamber 66. As described above, based on the overall dispense rate, the controller communicates with the motor unit 28, 428 to dispense appropriate ratios and dispense rate of individual colored thixotropic pastes to substantially match the desired overall dispense rate and the desired output color.

At 280, the controller of the 3D printing pen sends signal(s) to a mixer motor unit, e.g., mixer motor unit 49, 449, to mix, blend, and/or distribute individual colored thixotropic pastes 18 received in the mixing chamber. Again, under some conditions or operational states, the controller may or may not send signal(s) to the mixer motor unit if no mixing or blending is required. For example, if the selected output color is only one of cyan, magenta, yellow, black, etc., then the mixer motor unit 49, 449 is not operated or actuated.

At 290, upon the output colored thixotropic paste being dispensed from a mixing tip, for example, mixing tip 41, 441, the controller of the 3D printing pen or 3D printing system, may send signal(s) to a projection module, e.g., projection module 68, 468 to emit a light having a certain desired wavelength. For example, as described above, a light engine assembly of the projection module, may include one or more light sources that may emit light at a desired wavelength to cure the forming material, for example, the output thixotropic paste.

While not illustrated in detail, in some embodiments, the 3D printing pen may include storage chambers that may be selectively dispensed or discarded upon one or more uses. For example, in some embodiments, any excess colored thixotropic pastes 18, individually, or mixed or combined to form the output thixotropic paste may be stored in one or more storage chamber(s), or discarded or expelled. Moreover, the various embodiments or implementations described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments or implementations in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A three-dimensional printing pen, comprising:
a plurality of cartridges, each cartridge having a hollow cartridge body sized and shaped to include a colored thixotropic paste, a color of each thixotropic paste being different from a color of another thixotropic paste;
a plurality of nozzles, each nozzle fluidly communicatively coupled to a corresponding cartridge;
a motor unit comprising a plurality of motors that are radially spaced apart relative to a central axis of the three-dimensional printing pen, each motor coupled to a corresponding one of the plurality of cartridges, the motor unit operable to expel the colored thixotropic paste from each cartridge through the corresponding nozzle;

a rotor hub having a plurality of coupling members, each one of the plurality of coupling members sized and shaped to couple to a corresponding one of the plurality of nozzles;

a mixing housing;

a mixing tip fluidly communicatively coupled to the plurality of nozzles via the mixing housing, the mixing tip sized and shaped to dispense therethrough one or more of the colored thixotropic pastes in a form of an output thixotropic paste;

a projection module having a light engine assembly that emits light having a wavelength, the light being projected to the output thixotropic paste to cure the output thixotropic paste that is dispensed from the mixing tip; and a plurality of light sources circumferentially spaced apart and coupled to a ring, wherein each one of the plurality of light sources is operable to illuminate in a distinct color.

2. The three-dimensional printing pen of claim 1, further comprising:

a controller communicably coupled to the motor unit and the projection module, the controller operable to:

drive the motor unit to expel the one or more of the colored thixotropic pastes in the form of the output thixotropic paste; and cause the projection module to emit light having the wavelength to cure the output thixotropic paste.

3. The three-dimensional printing pen of claim 1, further comprising:

a mixing chamber fluidly communicatively coupled to the plurality of nozzles, the mixing chamber sized and shaped to receive the colored thixotropic paste from each nozzle.

4. The three-dimensional printing pen of claim 1, further comprising:

a mixing chamber fluidly communicatively coupled to the plurality of nozzles, the mixing chamber sized and shaped to receive the colored thixotropic paste from each nozzle; and a mixing motor unit that is operable to mix colored thixotropic pastes received in the mixing chamber.

5. The three-dimensional printing pen of claim 1, wherein each cartridge is radially spaced apart from another cartridge relative to a central axis of the three-dimensional printing pen.

6. The three-dimensional printing pen of claim 1, further comprising:

one or more color sensors which sense a color of an object; and a controller communicably coupled to the one or more color sensors, the controller, in response to sensing of the color of the object, causing the motor unit to dispense the colored thixotropic pastes in a ratio that results in the output thixotropic paste to have a color that substantially matches the color of the object sensed by the one or more color sensors.

7. The three-dimensional printing pen of claim 1, further comprising:

a button that moves in response to pressure being applied to a surface of the button;

one or more force sensors coupled to the button, the one or more force sensors detecting the pressure being applied to the surface of the button; and a controller communicably coupled to the one or more force sensors, the controller, in response to sensing of the pressure, determining a dispense rate of the output thixotropic paste.

8. The three-dimensional printing pen of claim 1, wherein the plurality of cartridges include:

a first cartridge including the colored thixotropic paste that comprises a cyan thixotropic paste;

a second cartridge including the colored thixotropic paste that comprises a magenta thixotropic paste;

a third cartridge including the colored thixotropic paste that comprises a yellow thixotropic paste;

a fourth cartridge including the colored thixotropic paste that comprises a key thixotropic paste; and a fifth cartridge including the colored thixotropic paste that comprises a white thixotropic paste.

9. The three-dimensional printing pen of claim 1, wherein each of the plurality of motors comprises a stepper motor.

10. The three-dimensional printing pen of claim 1, wherein the one or more light sources are operable to illuminate in a color that substantially matches the color of the output thixotropic paste.

11. A three-dimensional printing system, comprising:

a three-dimensional printing pen including:

a plurality of cartridges, each cartridge radially spaced apart and having a hollow cartridge body sized and shaped to include a colored thixotropic paste, a color of each thixotropic paste being different from a color of another thixotropic paste;

a plurality of nozzles, each nozzle fluidly communicatively coupled to a corresponding cartridge;

a rotor hub having a plurality of coupling members, each one of the plurality of coupling members sized and shaped to couple to a corresponding one of the plurality of nozzles;

a mixing housing;

a mixing tip fluidly communicatively coupled to the plurality of nozzles via the mixing housing, the mixing tip sized and shaped to dispense therethrough one or more of the colored thixotropic pastes in a form of an output thixotropic paste;

a plurality of light sources circumferentially spaced apart and coupled to a ring, wherein each one of the plurality of light sources is operable to illuminate in a distinct color;

a dispensing apparatus having a motor unit, the motor unit including a plurality of radially spaced apart motors, each of the plurality of motors coupled to a corresponding one of the plurality of cartridges;

a projection module having a light engine assembly; and control circuitry that is communicably coupled to the three-dimensional printing pen, the dispensing apparatus, and the projection module, the control circuitry, which in operation:

generates one or more signals indicative of a color of the output thixotropic paste;

generates one or more signals to cause the motor unit to expel the colored thixotropic paste from each cartridge through the corresponding nozzle to substantially match the color of the output thixotropic paste; and generates one or more signals to cause the projection module to emit light from the light engine assembly at a wavelength which cures the output thixotropic paste to form a desired object.

12. The three-dimensional printing system of claim 11, further comprising one or more color sensors.

13. The three-dimensional printing system of claim 11, further comprising a power source that supplies power to the three-dimensional printing pen, the projection module, and the dispensing apparatus.

14. The three-dimensional printing system of claim 11, further comprising:
one or more force sensors that detect a force being applied to the three-dimensional printing pen; and
in response to the force being detected, the control circuitry generates one or more signals indicative of an overall dispense rate of the output thixotropic paste.

15. The three-dimensional printing system of claim 11, further comprising:
a dynamic mixing apparatus having a mixing motor unit that is communicably coupled to the control circuitry, the control circuitry generating one or more signals to cause the mixing motor unit to mix the colored thixotropic pastes to form the output thixotropic paste having an output color.

16. The three-dimensional printing pen of claim 2 wherein the controller is communicably coupled to a mixer unit, the controller including a pulse width modulation module, and operable to control a width of a control pulse based on modular signal information.

17. The three-dimensional printing pen of claim 1, further comprising:
a mixing rotor which includes:
a mixing rotor shaft, and
a plurality of radially spaced apart mixing blades, the mixing blades rotatable to mix, blend, and distribute the colored thixotropic paste.

18. The three-dimensional printing pen of claim 2, further comprising:
one or more motion sensors communicably coupled to the controller, the one or more motion sensors operable to sense a position of the three-dimensional printing pen relative to a working surface, the one or motion sensors transmitting:
a signal to the controller to activate the three-dimensional printing pen when the mixing tip is positioned angularly with respect to the working surface; and
a signal to the controller to deactivate the three-dimensional printing pen when the mixing tip is facing away from the working surface.

19. A three-dimensional printing pen, comprising:
a plurality of cartridges, each cartridge radially spaced apart and having a hollow cartridge body sized and shaped to include a colored thixotropic paste, a color of each thixotropic paste being different from a color of another thixotropic paste;
a plurality of nozzles, each nozzle fluidly communicatively coupled to a corresponding cartridge;
a motor unit comprising a plurality of motors that are radially spaced apart relative to a central axis of the three-dimensional printing pen, each motor coupled to a corresponding one of the plurality of cartridges, the motor unit operable to expel the colored thixotropic paste from each cartridge through the corresponding nozzle;
a rotor hub having a plurality of coupling members, each one of the plurality of coupling members sized and shaped to couple to a corresponding one of the plurality of nozzles;
a mixing housing;
a mixing tip fluidly communicatively coupled to the plurality of nozzles via the mixing housing, the mixing tip sized and shaped to dispense therethrough one or more of the colored thixotropic pastes in a form of an output thixotropic paste;
a projection module having a light engine assembly that emits light having a wavelength, the light being projected to the output thixotropic paste to cure the output thixotropic paste that is dispensed from the mixing tip; and
an end cap assembly having:
an end cap body;
a ring mounted around the end cap body; and
a plurality of light sources circumferentially spaced apart and coupled to the ring, wherein each one of the plurality of light sources is operable to illuminate in a distinct color.

* * * * *